(12) United States Patent
Abe

(10) Patent No.: US 8,941,857 B2
(45) Date of Patent: Jan. 27, 2015

(54) INFORMATION PROCESSING SYSTEM, INFORMATION PROCESSING APPARATUS, AND NON-TRANSITORY COMPUTER READABLE MEDIUM

(71) Applicant: Fuji Xerox Co., Ltd., Minato-ku, Tokyo (JP)

(72) Inventor: Noriyuki Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/135,985

(22) Filed: Dec. 20, 2013

(65) Prior Publication Data
US 2014/0333952 A1 Nov. 13, 2014

(30) Foreign Application Priority Data
May 8, 2013 (JP) ................................. 2013-098216

(51) Int. Cl.
*G06K 15/00* (2006.01)
*G06F 3/12* (2006.01)

(52) U.S. Cl.
CPC ............ *G06F 3/1222* (2013.01); *G06F 3/1238* (2013.01)
USPC ....... 358/1.14; 358/1.13; 358/1.15; 358/1.16; 358/1.18

(58) Field of Classification Search
None
See application file for complete search history.

(56) References Cited

U.S. PATENT DOCUMENTS

| | | | |
|---|---|---|---|
| 7,823,187 B2 * | 10/2010 | Tanaka et al. | 726/1 |
| 2006/0277407 A1 * | 12/2006 | Matsuki | 713/170 |
| 2007/0115494 A1 * | 5/2007 | Nakayama | 358/1.14 |
| 2008/0148051 A1 * | 6/2008 | Ozaki et al. | 713/168 |

FOREIGN PATENT DOCUMENTS

JP 2009-110255 A 5/2009

* cited by examiner

*Primary Examiner* — Miya J Cato
(74) *Attorney, Agent, or Firm* — Sughrue Mion, PLLC

(57) ABSTRACT

An information processing system includes plural information processing apparatuses and a management apparatus. A first information processing apparatus includes a first notifying unit that notifies the management apparatus of a storage location associated with updated authentication information. The management apparatus notifies the first information processing apparatus of apparatus identifying information concerning the received storage location. A second notifying unit notifies an information processing apparatus identified by the apparatus identifying information of the storage location and the updated authentication information. A third notifying unit notifies the management apparatus of apparatus identifying information concerning an information processing apparatus to which the second notifying unit has failed to supply the information. The management apparatus notifies this information processing apparatus of the storage location and apparatus identifying information concerning an information processing apparatus in which the authentication information is updated. An updating unit of this information processing apparatus updates authentication information.

11 Claims, 13 Drawing Sheets

| DATA STORAGE LOCATION | AUTHENTICATION INFORMATION |
|---|---|
| F: S0001 | pass1 |
| F: S0002 | passA |
| F: S0003 | pass3 |
| | |

710 — DATA STORAGE LOCATION
720 — AUTHENTICATION INFORMATION

| DEVICE ID | DEVICE NAME | ADDRESS | REGULAR POLLING TIME | PUBLIC KEY |
|---|---|---|---|---|
| D0001 | DEVICE 10-1 | 192.168.0.1 | 12:00 | ••••• |
| D0002 | DEVICE 10-2 | 192.168.0.2 | 13:00 | ••••• |
| D0003 | DEVICE 10-3 | 192.168.0.3 | 14:00 | ••••• |
| | | | | |

810 — DEVICE ID
820 — DEVICE NAME
830 — ADDRESS
840 — REGULAR POLLING TIME
850 — PUBLIC KEY

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-098216 filed May 8, 2013.

BACKGROUND

Technical Field

The present invention relates to an information processing system, an information processing apparatus, and a non-transitory computer readable medium.

SUMMARY

According to an aspect of the invention, there is provided an information processing system including: plural information processing apparatuses; and a management apparatus. A first information processing apparatus of the plural information processing apparatuses includes a memory that stores therein, in association with each storage location in which information is stored, authentication information to be used when storing processed information in a storage location, and a first notifying unit that notifies, when authentication information associated with a storage location is updated, the management apparatus of the storage location associated with the updated authentication information. The management apparatus includes a recording unit that records apparatus identifying information for identifying each of the plural information processing apparatuses and information concerning a storage location in which information processed by each of the plural information processing apparatuses is stored such that the apparatus identifying information and the information concerning a storage location are associated with each other, an extracting unit that extracts apparatus identifying information which is recorded by the recording unit in association with information concerning the storage location supplied from the first notifying unit, and a first apparatus information notifying unit that notifies the first information processing apparatus of the apparatus identifying information extracted by the extracting unit in response to the information concerning the storage location received from the first notifying unit. The first information processing apparatus further includes a second notifying unit that notifies, upon receiving the apparatus identifying information from the first apparatus information notifying unit, an information processing apparatus identified by the apparatus identifying information received from the first apparatus information notifying unit of the storage location associated with the updated authentication information and the updated authentication information, and a third notifying unit that notifies, if the second notifying unit has failed to supply the storage location associated with the updated authentication information and the updated authentication information, the management apparatus of apparatus identifying information concerning a second information processing apparatus of the plural information processing apparatuses to which the second notifying unit has succeeded in supplying the storage location associated with the updated authentication information and the updated authentication information and apparatus identifying information concerning a third information processing apparatus of the plural information processing apparatuses to which the second notifying unit has failed to supply the storage location associated with the updated authentication information and the updated authentication information. The management apparatus further includes a second apparatus information notifying unit that notifies, upon receiving communication from the third information processing apparatus, the third information processing apparatus of the storage location associated with the updated authentication information and apparatus identifying information concerning an information processing apparatus in which the authentication information is updated. The third information processing apparatus includes a second memory that stores therein, in association with each storage location in which information is stored, authentication information to be used when storing processed information in a storage location, a fourth notifying unit that sends, upon receiving the information concerning the storage location and the apparatus identifying information from the second apparatus information notifying unit, a query about updated authentication information associated with the storage location to the information processing apparatus identified by the apparatus identifying information received from the second apparatus information notifying unit, and an updating unit that updates, upon receiving updated authentication information in response to the query, authentication information associated with the storage location stored in the second memory to the received updated authentication information.

BRIEF DESCRIPTION OF THE DRAWINGS

Exemplary embodiments of the present invention will be described in detail based on the following figures, wherein:

FIG. 7 illustrates an example of the data structure of an authentication table;

FIG. 8 illustrates an example of the data structure of a management device table;

DETAILED DESCRIPTION

Figure 1A:
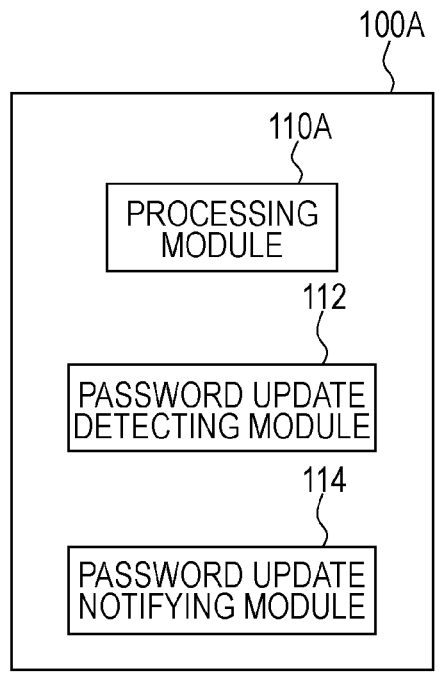
FIGS. 1A and 1B are block diagrams illustrating conceptual modules forming an example of the configuration of an exemplary embodiment (information processing apparatus)

Exemplary embodiments of the present invention will be described below with reference to the accompanying drawings.

FIGS. 1A through 3 are block diagrams illustrating conceptual modules forming an example of the configuration of an exemplary embodiment (first through third exemplary embodiments).

Generally, modules are software (computer programs) components or hardware components that can be logically separated from one another. Accordingly, the modules of exemplary embodiments of the invention are not only modules of a computer program, but also modules of a hardware configuration. Thus, the exemplary embodiments will also be described in the form of a computer program for allowing a computer to function as those modules (a program for causing a computer to execute program steps, a program for allowing a computer to function as corresponding units, a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program is stored in a storage device. Modules may correspond to functions based on a one-on-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationship among data elements, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether case A is satisfied, and B is performed if it is determined that case A is satisfied", unless such a determination is necessary.

A system or an apparatus may be realized by connecting plural computers, hardware units, devices, etc., to one another via a communication medium, such as a network (including communication based on a one-on-one correspondence), or may be realized by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processed result is written into the storage device. Accordingly, a description of reading from the storage device before an operation or writing into the storage device after an operation may be omitted. Examples of the storage device may be a hard disk (HD), a random access memory (RAM), an external storage medium, a storage device using a communication line, a register within a central processing unit (CPU), etc.

Figure 1B:
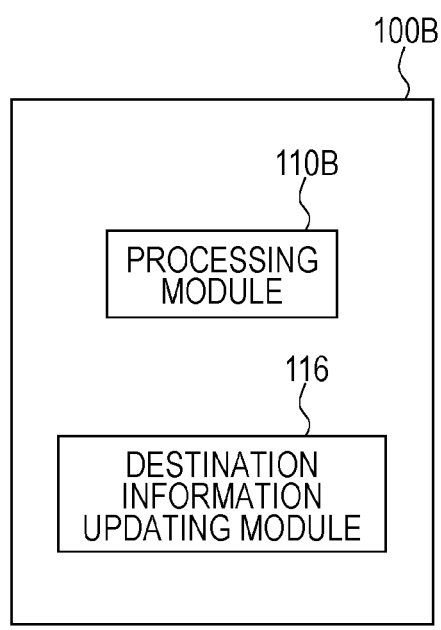
Figure 2:
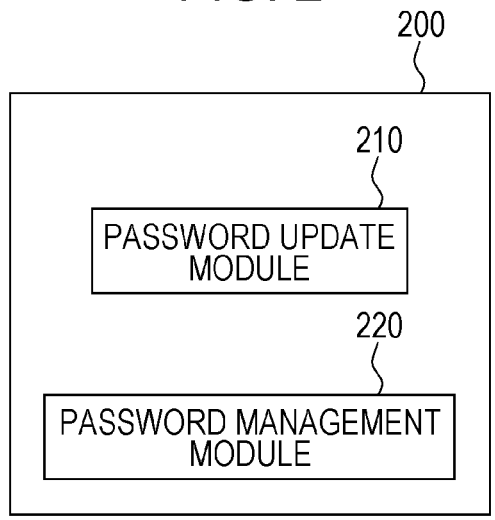
FIG. 2 is a block diagram illustrating conceptual modules forming an example of the configuration of an exemplary embodiment (client information processing apparatus)
Figure 3:
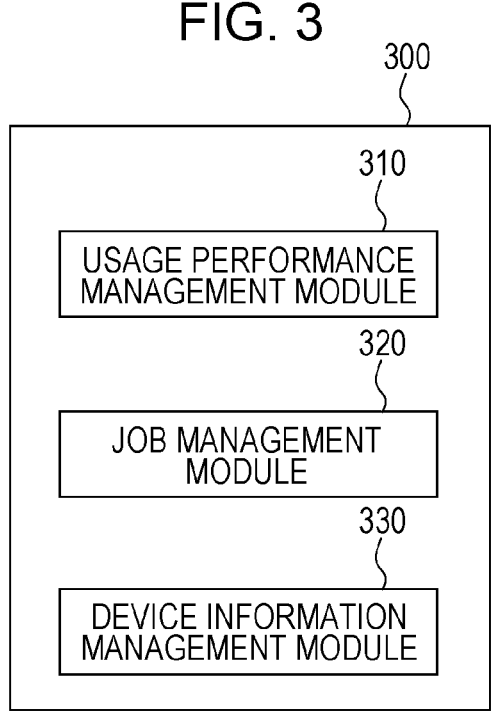
FIG. 3 is a block diagram illustrating conceptual modules forming an example of the configuration of an exemplary embodiment (management apparatus)

An information processing system of this exemplary embodiment is a system in which, when authentication information used for storing information in a specific storage location has been updated in an information processing apparatus, even if the information processing apparatus has failed to notify another information processing apparatus which is necessary to update authentication information of the updated authentication information, this information processing apparatus is able to update the authentication information through communication of a management apparatus. An information processing apparatus A (100A) includes, as shown in FIG. 1A, a processing module 110A, a password update detecting module 112, and a password update notifying module 114. The information processing apparatus B (100B) includes, as shown in FIG. 1B, a processing module 110B and a destination information updating module 116. The information processing apparatus A (100A) and the information processing apparatus B (100B) shown in FIGS. 1A and 1B, respectively, are examples of an information processing apparatus 100. As an information processing apparatus 100, a combination of the information processing apparatus A (100A) and the information processing apparatus B (100B) may be used. That is, an information processing apparatus 100 may include a processing module 110, a password update detecting module 112, a password update notifying module 114, and a destination information updating module 116. Generally, in many cases, a combination of the information processing apparatus 100A and the information processing apparatus 100B is used as the information processing apparatus 100. As shown in FIG. 2, a client information processing apparatus 200 includes a password update module 210 and a password management module 220. As shown in FIG. 3, a management apparatus 300 includes a usage performance management module 310, a job management module 320, and a device information management module 330.

Figure 5:
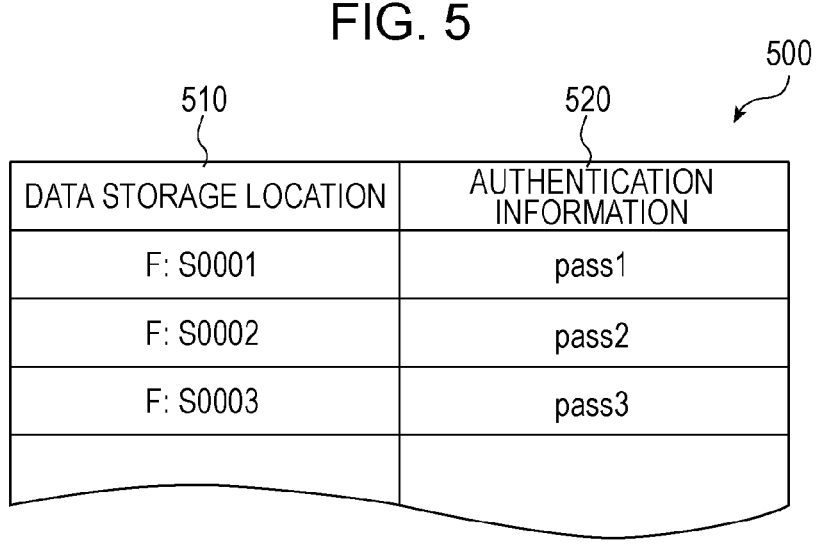
FIG. 5 illustrates an example of the data structure of a data storage location table.

The information processing apparatus 100 stores, in association with each storage location in which information is stored, authentication information used when storing processed information in a storage location. The information processing apparatus 100 stores, for example, a data storage location table 500. FIG. 5 illustrates an example of the data structure of the data storage location table 500. The data storage location table 500 includes a data storage location field 510 and an authentication information field 520. The data storage location table 500 is data which indicates authentication information in association with an identifier, such as Uniform Resource Locator (URL), which specifies a storage location. The identifier which specifies a storage location may be constituted by an address (an Internet Protocol (IP) address or a host name) of the client information processing apparatus 200, or a folder or file name of the client information processing apparatus 200. Authentication information is data used for conducting authentication when storing data in a data storage location. If authentication based on authentication information has been successfully conducted (if the authentication information matches official authentication information), the storage of the data in the data storage location is permitted, and if authentication based on authentication information has not been successfully conducted (if the authentication information does not match official authentication information), the storage of the data in the data storage location is not permitted. The authentication information may be a password, or if authentication information is different according to the user, the authentication information may be a combination of a user ID and a password.

Figure 6:
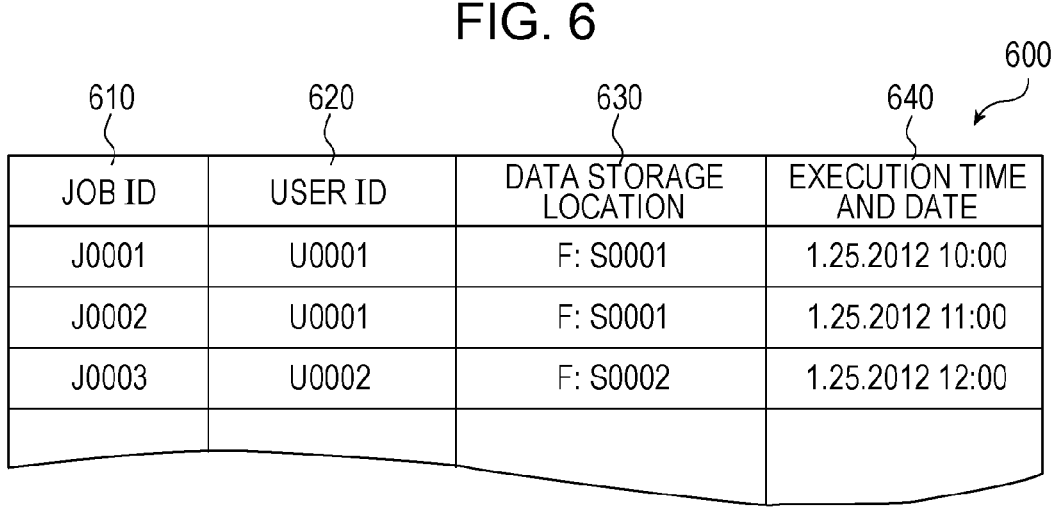
FIG. 6 illustrates an example of the data structure of a processing history table.

Each of the processing module 110A of the information processing apparatus A (100A) and the processing module 110B of the information processing apparatus B (100B) stores, for each storage location in which information is stored, processed information in a storage location. For example, if the information processing apparatus 100 is a scanner or a multifunction device (an image processing apparatus including at least two functions of a scanner, a printer, a copying machine, and a fax machine), the processing module 110A stores a read image (an example of the information) in a folder (an example of the storage location) within the client information processing apparatus 200. The processing module 110A then stores a result of processing the image, for example, a processing history table 600 shown in FIG. 6. FIG. 6 shows an example of the data structure of the processing history table 600. The processing history table 600 includes a job ID field 610, a user ID field 620, a data storage location field 630, and an execution date and time field 640. As shown in FIG. 6, in the processing history table 600, a job ID for identifying processing (job) executed in an information processing apparatus 100, a user ID for identifying a user who has requested a job executed in an information processing apparatus 100, a data storage location in which data processed in a job is stored, and the date and time of the execution of a job are stored in association with each other. Every time the information processing apparatus 100 executes a job, it may record history information concerning the executed job in the processing history table 600. The information processing apparatus 100 may send the processing history table 600 to the management apparatus 300 at a predetermined timing (for example, a predetermined date and time or a predetermined time interval), or when there is a request to send the processing history table 600 from the management apparatus 300.

The password update detecting module 112 of the information processing apparatus A (100A) detects that authentication information associated with a storage location has been updated. In this case, "updated" means that authentication information has been changed to new authentication information and also means that new authentication information has been created. Updating of authentication information may be performed regularly. Alternatively, updating may be performed automatically or whenever necessary, or upon a request of an operator. Updating of authentication information may be performed by the client information processing apparatus 200 or the information processing apparatus 100. For example, the password update detecting module 112 detects that data within the authentication information field 520 of the data storage location table 500 has been changed or a new item of data has been created in the authentication information field 520. This will be described more specifically. It is assumed that the information processing apparatus 100 has failed to store data in the data storage location table 500 by using authentication information because this authentication information has been updated and that the operator has input new authentication information. In this case, data within the authentication information field 520 of the data storage location table 500 is changed, and thus, the password update detecting module 112 detects this change. Additionally, the validity of updated authentication information may also be checked.

When the password update detecting module 112 has detected the updating of authentication information, the password update notifying module 114 of the information processing apparatus A (100A) notifies the management apparatus 300 of a storage location associated with the updated authentication information. For example, the password update notifying module 114 notifies the management apparatus 300 of data within the data storage location field 510 associated with the updated authentication information. In this case, the password update notifying module 114 does not notify the management apparatus 300 of the updated authentication information itself in order to avoid a leakage of the authentication information to the exterior.

If the password update notifying module 114 has received apparatus identifying information from the management apparatus 300, it notifies an information processing apparatus identified by this apparatus identifying information received from the management apparatus 300 of a storage location associated with updated authentication information and the updated authentication information. That is, the password update notifying module 114 notifies another information processing apparatus 100 (for example, the information processing apparatus B (100B)) which is necessary to update authentication information of a storage location associated with updated authentication information and the updated authentication information.

Then, if the password update notifying module 114 has failed to notify another information processing apparatus of a storage location associated with updated authentication information and the updated authentication information, it notifies the management apparatus 300 of apparatus identifying information concerning a second information processing apparatus (information processing apparatus 100 (for example, the information processing apparatus B (100B)) to which the password update notifying module 114 has succeeded in supplying information concerning the storage location and the updated authentication information and apparatus identifying information concerning a third information processing apparatus (information processing apparatus 100 (for example, an information processing apparatus C (100C), which is configured similarly to the information processing apparatus B (100B)) to which the password update notifying module 114 has failed to supply information concerning the storage location and the updated authentication. In this case, "failed to supply information" means, for example, that the third information processing apparatus (information processing apparatus 100 (for example, the information processing apparatus C (100C)) has been powered OFF or that a communication failure with the third information processing apparatus 100 has occurred. This will be described later more specifically with reference to FIG. 12.

If the password update notifying module 114 has received apparatus identifying information from the management apparatus 300, it notifies an information processing apparatus identified by this apparatus identifying information received from the management apparatus 300 of a storage location associated with updated authentication information and this updated authentication information. That is, the password update notifying module 114 notifies another information processing apparatus 100 (for example, the information processing apparatus B (100B)) which is necessary to update authentication information of a storage location associated with updated authentication information and this updated authentication information.

Then, if the password update notifying module 114 has failed to notify another information processing apparatus of a storage location associated with updated authentication information and this updated authentication information, it notifies the management apparatus 300 of apparatus identifying information concerning a third information processing apparatus (information processing apparatus 100 (for example, the information processing apparatus C (100C)) and updated authentication information encrypted with a public key related to the third information processing apparatus. That is, if the password update notifying module 114 has failed to notify a storage location and updated authentication information, it requests the management apparatus 300 to notify the third information processing apparatus of the storage location and the updated authentication information. In this case, however, instead of the updated authentication information itself, the password update notifying module 114 supplies the encrypted authentication information by using a public key related to the third information processing apparatus to the management apparatus 300. This will be discussed later more specifically with reference to FIG. 13.

If the password update notifying module 114 has received apparatus identifying information from the management apparatus 300, and if this apparatus identifying information indicates a second information processing apparatus to which information is not added, the password update notifying module 114 notifies the second information processing apparatus of a storage location associated with updated authentication information and this updated authentication information. That is, the password update notifying module 114 notifies the second information processing apparatus (an information processing apparatus 100, for example, the information processing apparatus B (100B), which is necessary to update authentication information) of a storage location associated with updated authentication information and this updated authentication information. In this case, the apparatus identifying information which identifies this information processing apparatus B (100B) does not have a flag indicating that the information processing apparatus A (100A) does not have to notify this information processing apparatus of an updated password.

Then, the password update notifying module 114 notifies the management apparatus 300 of updated authentication information encrypted with a public key of the third information processing apparatus (for example, the information processing apparatus C (100C). In this case, the apparatus identifying information which identifies this information processing apparatus C (100C) has a flag indicating that the information processing apparatus A (100A) does not have to notify this information processing apparatus of an updated password. That is, the password update notifying module 114 requests the management apparatus 300 to notify the information processing apparatus C (100C) of the storage location and the updated authentication information. In this case, however, instead of the updated authentication information itself, the password update notifying module 114 supplies the authentication information encrypted with a public key related to the third information processing apparatus to the management apparatus 300. This will be discussed later more specifically with reference to FIG. 14.

If the destination information updating module 116 of the information processing apparatus B (100B), which serves as the second information processing apparatus, has received a storage location associated with updated authentication information and this updated authentication information from the password update notifying module 114 of the information processing apparatus A (100A), it updates information to be stored by the processing module 110B on the basis of the storage location and the updated authentication information received from the password update notifying module 114. That is, the destination information updating module 116 overwrites authentication information in the authentication information field 520 associated with the subject storage location in the data storage location field 510 of the data storage location table 500 within the information processing apparatus B (100B) with the updated authentication information. With this operation, when the information processing apparatus 100 (information processing apparatus A (100A) has detected that authentication information has been updated, the updating of the authentication information is also reflected in the authentication information in the information processing apparatus B (100B), thereby eliminating the need for an operator of the information processing apparatus B (100B) to update the authentication information. This will be discussed later more specifically with reference to FIGS. 12 through 14.

If the destination information updating module 116 of the information processing apparatus C (100C), which serves as the third information processing apparatus, has received apparatus identifying information from the job management module 320 of the management apparatus 300, it sends a query about updated authentication information associated with a subject storage location to an information processing apparatus identified by the apparatus identifying information received from the job management module 320 of the management apparatus 300. Then, if the destination information updating module 116 has received updated authentication information in response to this query, it updates information to be stored by the processing module 110B on the basis of the received updated authentication information. That is, the information processing apparatus C (100C), which has failed to communicate with the information processing apparatus A (100A), obtains updated authentication information from an information processing apparatus 100 (information processing apparatus A (100A) or information processing apparatus B (100B)) in which the updated authentication information has already been stored, and overwrites the authentication information in the authentication information field 520 associated with the subject storage location in the data storage location field 510 of the data storage location table 500 within the information processing apparatus C (100C) with the obtained updated authentication information. This will be discussed later more specifically with reference to FIG. 12.

If the destination information updating module 116 of the information processing apparatus C (100C), which serves as the third information processing apparatus, has received encrypted updated authentication information from the job management module 320 of the management apparatus 300, it decrypts the encrypted updated authentication information and updates information to be stored by the processing module 110B on the basis of the received updated authentication information. That is, the information processing apparatus C (100C), which has failed to communicate with the information processing apparatus A (100A), obtains encrypted updated authentication information and decrypts it by using a private key, thereby overwriting authentication information in the authentication information field 520 associated with the subject storage location in the data storage location field 510 of the data storage location table 500 within the information processing apparatus C (100C) with the decrypted updated authentication information. This will be discussed later more specifically with reference to FIG. 13.

If the destination information updating module 116 of the information processing apparatus C (100C), which serves as the third information processing apparatus, has received encrypted updated authentication information from the job management module 320 of the management apparatus 300, it decrypts the encrypted updated authentication information and updates information to be stored by the processing module 110B on the basis of the decrypted updated authentication information. That is, the information processing apparatus C (100C), which has been recognized as an information processing apparatus to which the information processing apparatus A (100A) does not have to send updated authentication information, obtains encrypted updated authentication information and decrypts it by using a private key, thereby overwriting authentication information in the authentication information field 520 associated with the subject storage location in the data storage location field 510 of the data storage location table 500 within the information processing apparatus C (100C) with the decrypted updated authentication information. This will be discussed later more specifically with reference to FIG. 14.

The client information processing apparatus 200 is, for example, a personal computer (PC) used by an operator.

The password update module 210 updates a password, which is an example of authentication information.

The password management module 220 manages the association between storage locations and items of authentication information. The password management module 220 stores, for example, an authentication table 700. FIG. 7 shows an example of the data structure of the authentication table 700. The authentication table 700 includes a data storage location field 710 and an authentication information field 720. As shown in FIG. 7, the authentication table 700 is data which indicates authentication information in association with an identifier, such as URL, which specifies a data storage location. The content of the authentication table 700 may be updated regularly. For example, in comparison with the data storage location table 500 shown in FIG. 5 stored in the information processing apparatus 100, it is seen that authentication information associated with the data storage location "F:S0002" in the authentication table 700 is updated.

The management apparatus 300 manages plural information processing apparatuses 100, for example, the usage status (for example, the number of printed sheets or the number of scanned sheets) and the failure status of each information processing apparatus 100.

Access may be made to the management apparatus 300 from an information processing apparatus 100 which is managed by the management apparatus 300 at a predetermined timing (for example, a predetermined time interval), and the management apparatus 300 obtains the processing history table 600 from the accessed information processing apparatus 100. Alternatively, the management apparatus 300 may cause the information processing apparatus 100 to send the processing history table 600 at a predetermined timing (for example, a predetermined time interval), and obtains the processing history table 600 from the information processing apparatus 100. When obtaining the processing history table 600, the management apparatus 300 may obtain only a difference from the previously obtained processing history table 600.

The device information management module 330 stores, for example, a management device table 800. FIG. 8 shows an example of the data structure of the management device table 800. The management device table 800 includes a device ID field 810, a device name field, 820, an address field 830, a regular polling time field 840, and a public key field 850. As shown in FIG. 8, in the management device table 800, a device ID for identifying an information processing apparatus 100 to be managed, a device name, an address (IP address), a regular polling time, and a public key are stored in association with each other. The management apparatus 300 may receive a registration request from an information processing apparatus 100, and if it accepts this registration request, it may store data concerning the information processing apparatus 100 in the management device table 800. The regular polling time is a communication due time at which an information processing apparatus 100 will communicate with the management apparatus 300. When this polling communication is performed, the management apparatus 300 responds to the information processing apparatus 100 by sending a command, such as a command to update authentication information, to the information processing apparatus 100. A public key is a key used in a public-key cryptosystem which is made open by the information processing apparatus 100, and a private key associated with the public key is stored within the information processing apparatus 100. Accordingly, upon receiving information encrypted with the public key, the information processing apparatus 100 decrypts the information with the private key.

Figure 9:
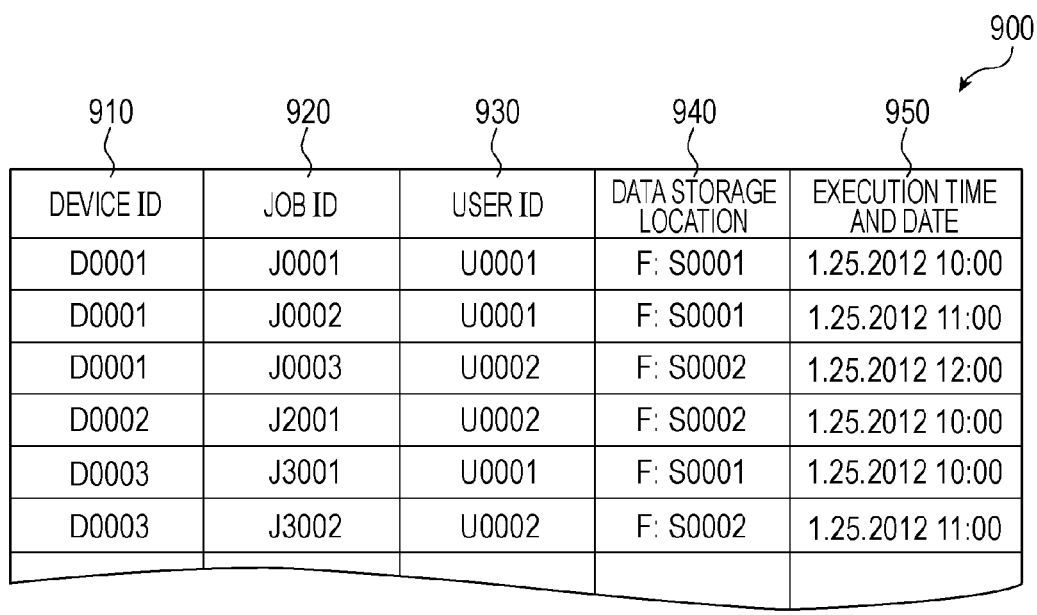
FIG. 9 illustrates an example of the data structure of a management device history table.

The usage performance management module 310 records apparatus identifying information (for example, a device ID) for identifying each of the plural information processing apparatuses 100 and information concerning a storage location in which information processed by each information processing apparatus 100 is stored in association with each other. The usage performance management module 310 also extracts identifying information of an operator who has succeeded in performing processing from a processing record (job log) obtained from an information processing apparatus 100, and manages the association between the operator and an information processing apparatus 100 used by the operator. The usage performance management module 310 also has a function of extracting an information processing apparatus 100 which has used processing from operator identifying information. The above-described processing operations are performed by using the processing history table 600 obtained from the information processing apparatus 100, as stated above. The usage performance management module 310 records, for example, a management device history table 900. FIG. 9 shows an example of the data structure of the management device history table 900. The management device history table 900 includes a device ID field 910, a job ID field 920, a user ID field 930, a data storage location field 940, and an execution date and time field 950. In the management device history table 900, a history of processing operations (jobs) performed in each of the information processing apparatuses 100 managed by the management apparatus 300 is recorded. As shown in FIG. 9, in the management device history table 900, a device ID for identifying an information processing apparatus 100, a job ID for identifying a job, a user ID for identifying a user, which is a requester of a job, a storage location (data storage location) in which processed data obtained by processing a job is stored, and a time and date at which a job has been executed are stored in association with each other. In the management device history table 900, it is sufficient that at least one of the user ID and the information concerning a data storage location is stored.

For example, the management device history table 900 and the management device table 800 may be managed in association with each other. Then, the device ID may be extracted on the basis of a data storage location of the management device history table 900, and the regular polling time and the public key in the management device table 800 associated with the extracted device ID in the management device history table 900 may be extracted.

The job management module 320 extracts apparatus identifying information recorded in the management device history table 900 in association with information concerning a storage location supplied from the password update notifying module 114 of the information processing apparatus A (100A), and then notifies the information processing apparatus A (100A) of the extracted apparatus identifying information. That is, the job management module 320 notifies the information processing apparatus 100, which has notified that authentication information has been updated, of the device ID of a storage location associated with the updated authentication information. The reason for supplying the device ID is that it is also necessary for the information processing apparatus 100 identified by this device ID to update authentication information. This will be discussed later more specifically with reference to FIG. 12.

Upon receiving communication from the third information processing apparatus (for example, the information processing apparatus C (100C)) identified by the apparatus identifying information received from the information processing apparatus A (100A), the job management module 320 notifies the third information processing apparatus of "information concerning a storage location" and "apparatus identifying information concerning an information processing apparatus in which authentication information has been updated (information processing apparatus A (100A) or information processing apparatus B (100B))". "Upon receiving communication from the third information processing apparatus" means, for example, that polling communication at the above-described regular polling time has been received. The reason for supplying "information concerning a storage location" is that it is necessary for the third information processing apparatus to determine whether there is authentication information to be updated. The management apparatus 300 does not possess updated authentication information itself, that is, the management apparatus 300 is not able to supply the updated authentication information to the third information processing apparatus. Accordingly, the management apparatus 300 notifies the third information processing apparatus of "apparatus identifying information concerning an information processing apparatus in which authentication information has been updated" so that the third information processing apparatus can obtain the updated authentication information from the information processing apparatus in which the authentication information has been updated. "Information concerning a storage location" is information received from the information processing apparatus A (100A), as stated above. "An information processing apparatus in which authentication information has been updated" may be an information processing apparatus 100 other than the information processing apparatus A (100A) which has notified the management apparatus 300 of "information concerning a storage location". This is because the information processing apparatus A (100A) has failed to communicate with the third information processing apparatus, and thus, it is desirable that the third information processing apparatus receive the updated authentication information from another information processing apparatus 100. This will be discussed later more specifically with reference to FIG. 12.

The job management module 320 extracts apparatus identifying information which is recorded in the management device history table 900 in association with information concerning a storage location supplied from the password update notifying module 114 of the information processing apparatus A (100A) and also extracts the public key recorded in the management device table 800 corresponding to the apparatus identifying information. The job management module 320 then notifies the information processing apparatus A (100A), which has notified that the authentication information has been updated, of the extracted apparatus identifying information and public key. That is, the job management module 320 notifies an information processing apparatus 100 which has notified that authentication information has been updated of the device ID of the storage location associated with the updated authentication information and the public key. The reason for supplying the device ID and the public key is that it is also necessary for the information processing apparatus 100 identified by this device ID to update authentication information. This will be discussed later more specifically with reference to FIG. 13.

Upon receiving communication from the third information processing apparatus identified by the apparatus identifying information received from the information processing apparatus A (100A), the job management module 320 notifies the third information processing apparatus of information concerning a storage location and encrypted updated authentication information. "Upon receiving communication from the third information processing apparatus" means, for example, that polling communication at the above-described regular polling time has been received. The reason for supplying "information concerning a storage location" is that it is necessary for the third information processing apparatus to determine whether there is authentication information to be updated. "Information concerning a storage location" is information received from the information processing apparatus A (100A), as stated above. "Updated authentication information" has been encrypted with a public key, and the management apparatus 300 has not obtained "updated authentication information" itself. This will be discussed later more specifically with reference to FIG. 13.

The job management module 320 extracts apparatus identifying information which is recorded in the management device history table 900 in association with information concerning a storage location supplied from the password update notifying module 114 of the information processing apparatus A (100A) and also extracts the communication due time recorded in the management device table 800 corresponding to the apparatus identifying information. The job management module 320 then notifies the information processing apparatus A (100A) of the extracted apparatus identifying information and a public key corresponding to the apparatus identifying information. That is, the job management module 320 notifies an information processing apparatus 100 which has notified that authentication information has been updated of the device ID of the storage location associated with the updated authentication information and the regular polling time. The reason for supplying the device ID and the regular polling time is that it is also necessary for the information processing apparatus 100 identified by this device ID to update authentication information. Then, if the communication due time corresponding to the extracted apparatus identifying information is within a predetermined time (more specifically, a predetermined time from a current time) and if the information processing apparatus 100 identified by this apparatus identifying information possesses a public key, the job management module 320 adds notification excluding information (for example, a notification excluding flag) indicating that the information processing apparatus A (100A) does not have to notify this information processing apparatus of an updated password to the extracted apparatus identifying information. The job management module 320 then notifies the information processing apparatus A (100A) of the apparatus identifying information and the public key. That is, since the regular polling time will arrive very soon, if the information processing apparatus 100 possesses the public key, the management apparatus 300 notifies the information processing apparatus 100 of the updated authentication information encrypted with the public key without causing the information processing apparatus A (100A) to notify the information processing apparatus 100 of the updated authentication information. This will be discussed later more specifically with reference to FIG. 14.

Upon receiving communication from the third information processing apparatus identified by the apparatus identifying information received from the information processing apparatus A (100A), the job management module 320 notifies the third information processing apparatus of information concerning a storage location and encrypted updated authentication information. "Upon receiving communication from the third information processing apparatus" means, for example, that polling communication at the above-described regular polling time has been received. The reason for supplying "information concerning a storage location" is that it is necessary for the third information processing apparatus to determine whether there is authentication information to be updated. "Information concerning a storage location" is information received from the information processing apparatus A (100A), as stated above. "Updated authentication information" has been encrypted with the public key, and the management apparatus 300 has not obtained "updated authentication information" itself. This will be discussed later more specifically with reference to FIG. 14.

The job management module 320 may extract a communication due time at which the information processing apparatus 100 will communicate with the management apparatus 300 from the management device table 800, and may notify the information processing apparatus A (100A) of the extracted communication due time.

Then, the password update notifying module 114 of the information processing apparatus A (100A) notifies the management apparatus 300 of the apparatus identifying information by a predetermined time before the communication due time supplied from the job management module 320. That is, the password update notifying module 114 is able to notify the management apparatus 300 of the apparatus identifying information at the latest before the regular polling time. This will be discussed later more specifically with reference to FIGS. 12 and 13.

Figure 4:
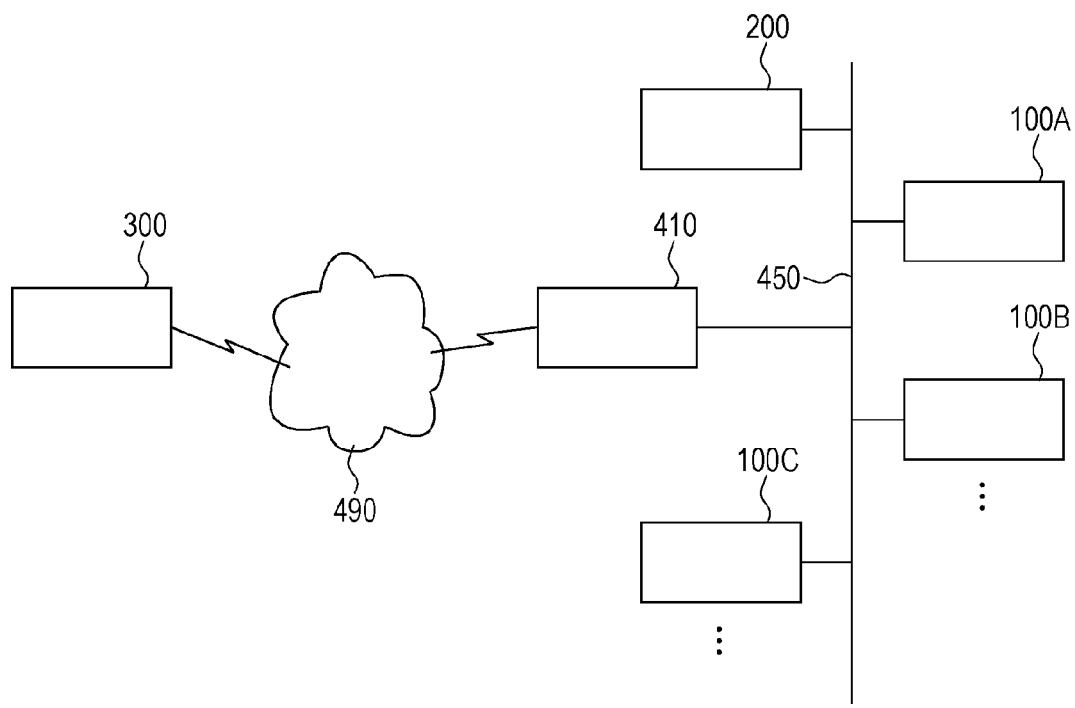
FIG. 4 is a block diagram illustrating an example of the configuration an information processing system which implements an exemplary embodiment.

FIG. 4 is a block diagram illustrating an example of the configuration the information processing system which implements this exemplary embodiment.

The information processing system includes at least plural information processing apparatuses 100 and the management apparatus 300. In the example shown in FIG. 4, the information processing system also includes the client information processing apparatus 200 and a firewall 410. That is, the information processing apparatus A (100A), the information processing apparatus B (100B), the information processing apparatus C (100C), and the client information processing apparatus 200 are connected to one another via a communication medium 450. The information processing apparatus A (100A), the information processing apparatus B (100B), the information processing apparatus C (100C), and the client information processing apparatus 200 are also connected to the management apparatus 300 via the communication medium 450, the firewall 410, and a communication medium 490. The management apparatus 300 is connected to the information processing apparatus A (100A), the information processing apparatus B (100B), the information processing apparatus C (100C), and the client information processing apparatus 200 via the communication medium 490, the firewall 410, and the communication medium 450.

The plural information processing apparatuses 100 are disposed within the firewall 410, and the management apparatus 300 is disposed outside the firewall 410. The communication medium 450 is, for example, a local network (such as an intranet) within an organization, and the communication medium 490 is, for example, a network (such as the Internet) extending outside the local network. The firewall 410 is disposed between the communication media 450 and 490. Examples of the firewall 410 is a router or a host provided for the purpose of blocking illegal access to the information processing apparatuses 100 connected to the communication medium 450 from the outside (through the communication medium 490).

The firewall 410 performs control so that the information processing apparatuses 100 may communicate with the management apparatus 300 but the management apparatus 300 may not communicate with the information processing apparatuses 100. However, if there is access from an information processing apparatus 100, the management apparatus 300 may communicate with the information processing apparatus 100 as a response to access from the information processing apparatus 100. In this case, the information processing apparatus 100 accesses the management apparatus 300 in order to send data stored in the processing history table 600 to the management apparatus 300 at a predetermined communication due time (millisecond, second, minute, hour, day, month, and year, or a combination thereof). That is, the information processing apparatus 100 performs polling communication. In response to this polling communication, the management apparatus 300 may communicate with the information processing apparatus 100 in a manner discussed above.

Figure 10:
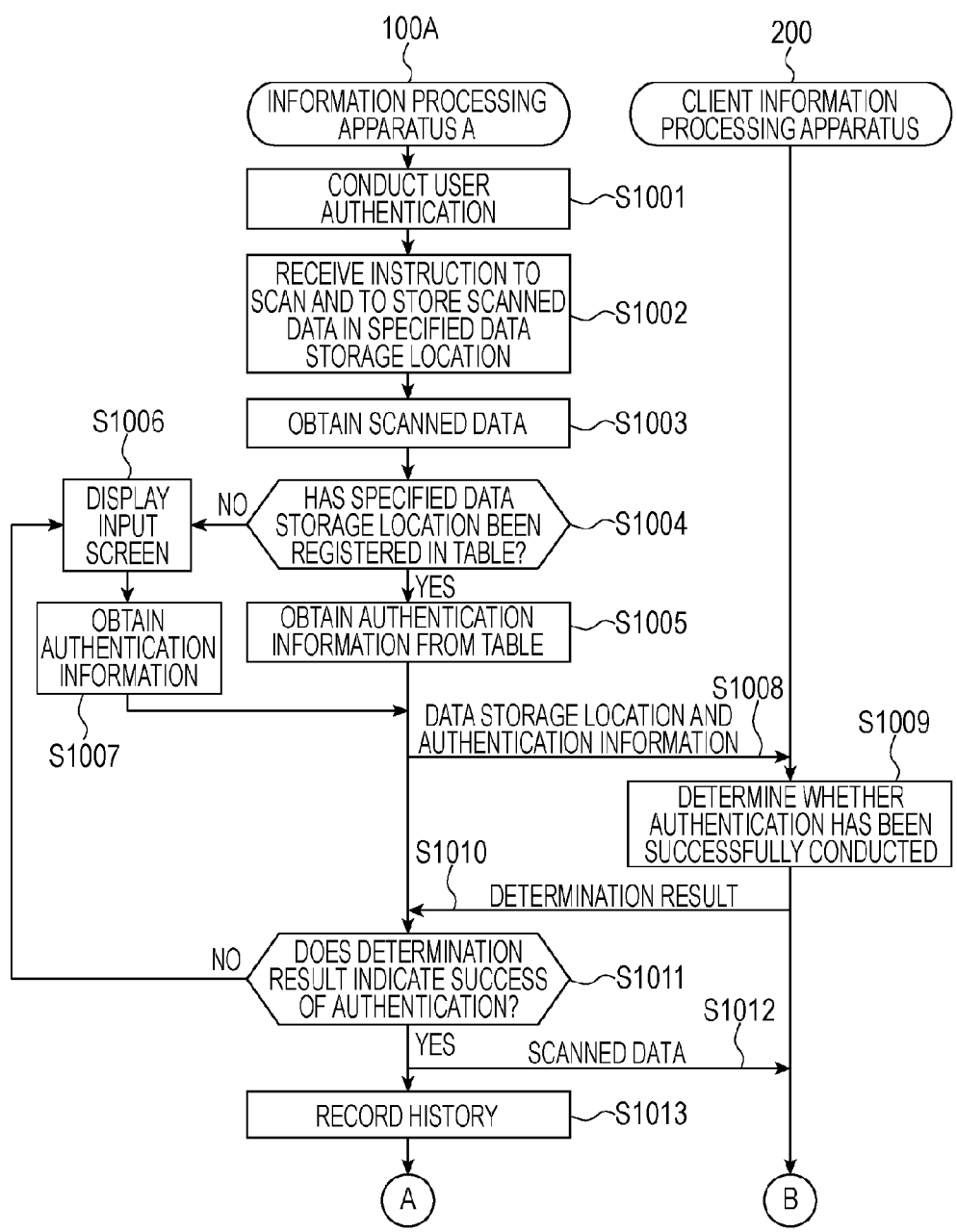
FIG. 10 is a flowchart illustrating an example of processing according to an exemplary embodiment.
Figure 11:
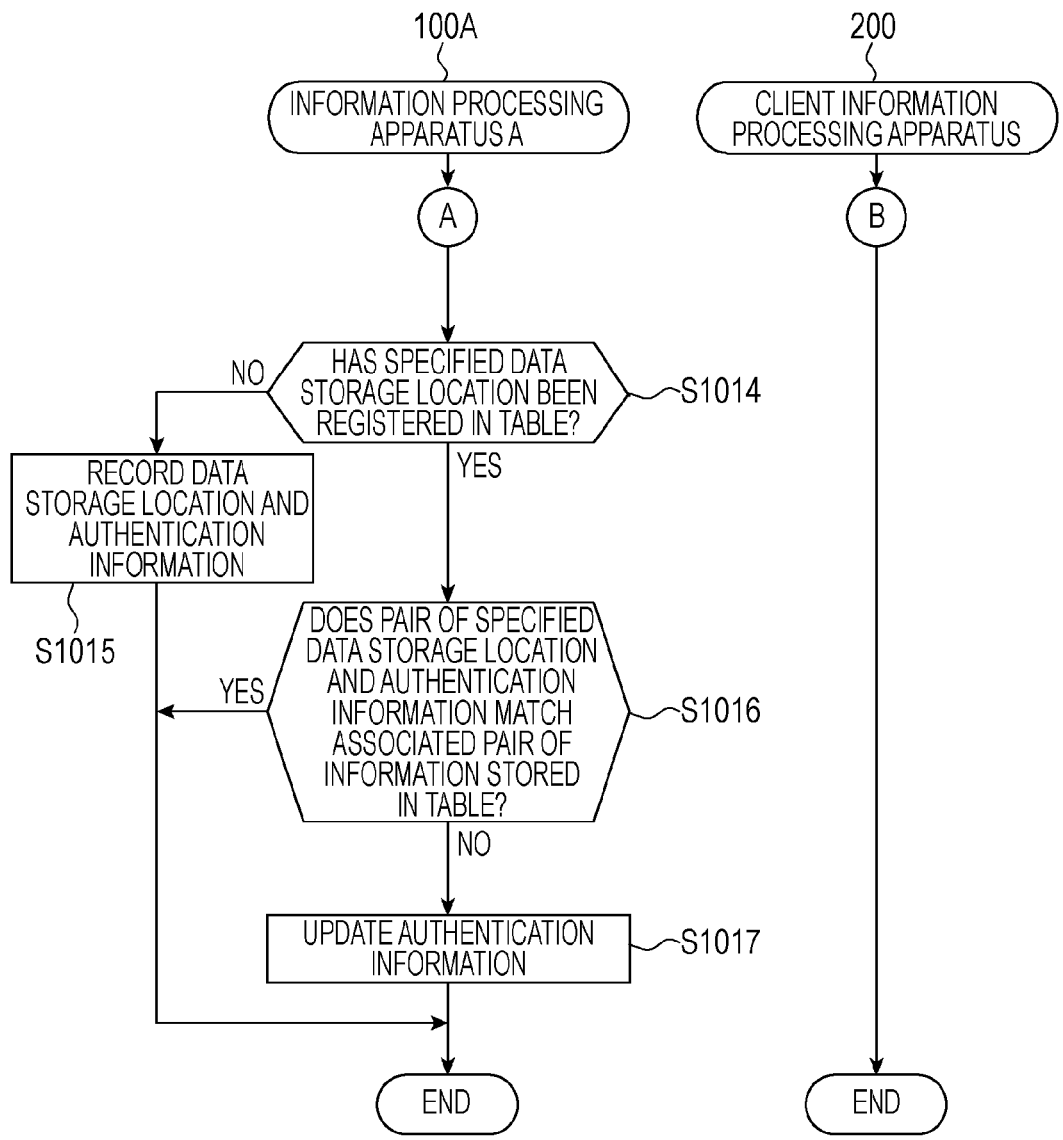
FIG. 11 is a flowchart illustrating an example of processing according to an exemplary embodiment.

FIGS. 10 and 11 are flowcharts of an example of processing in this exemplary embodiment. An example of processing performed by the above-described information processing system will be described below with reference to the flowcharts of FIGS. 10 and 11. This processing is a common sequence to be executed before processing of each of the first through third exemplary embodiments.

As shown in FIG. 10, in step S1001, the information processing apparatus A (100A) specifies a user ID and conducts user authentication. Then, in step S1002, the information processing apparatus A (100A) receives an instruction to scan and to store scanned data in a specified data storage location from the authenticated user. In step S1003, the information processing apparatus A (100A) obtains scanned data by using a scan module in response to the received instruction.

In step S1004, the information processing apparatus A (100A) determines whether the specified data storage location has been registered in the data storage location table 500 stored in the information processing apparatus A (100A). If the result of step S1004 is YES, the process proceeds to step S1005. In step S1005, the information processing apparatus A (100A) obtains authentication information associated with the specified data storage location stored in the data storage location table 500. If the result of step S1004 is NO, the process proceeds to step S1006. In step S1006, the information processing apparatus A (100A) displays an input screen for inputting authentication information on an operation panel. Then, in step S1007, the information processing apparatus A (100A) obtains authentication information input on the input screen.

Then, in step S1008, the information processing apparatus A (100A) sends information concerning the specified data storage location and the authentication information obtained in step S1005 or S1007 to the client information processing apparatus 200 and requests it to conduct authentication.

In step S1009, the client information processing apparatus 200 determines whether authentication has been successfully conducted on the basis of whether the information concerning the data storage location and the authentication information match the storage content of the authentication table 700 stored in the client information processing apparatus 200. In step S1010, the client information processing apparatus 200 sends a determination result to the information processing apparatus A (100A).

In step S1011, the information processing apparatus A (100A) determines whether the determination result received from the client information processing apparatus 200 indicates the success of authentication. If the result of step S1011 is NO, the process proceeds to step S1006. In step S1006, the information processing apparatus A (100A) instructs the user to input authentication information. If the result of step S1011 is YES, the process proceeds to step S1012. In step S1012, the information processing apparatus A (100A) transfers scanned data to the data storage location of the client information processing apparatus 200. In step S1013, the information processing apparatus A (100A) records history data concerning the above-described processing in the processing history table 600.

As shown in FIG. 11, in step S1014, the information processing apparatus A (100A) determines whether the specified data storage location has been registered in the data storage location table 500. If the result of step S1014 is NO, the process proceeds to step S1015. In step S1015, the information processing apparatus A (100A) records the specified data storage location and authentication information for which authentication has been successfully conducted in the data storage location table 500. Then, the information processing apparatus A (100A) terminates the processing. In this case, the authentication information is not updated.

If it is found in step S1014 that the specified data storage location has not been registered in the data storage location table 500, the process proceeds to step S1016 to determine whether a pair of the specified data storage location and the authentication information for which authentication has been successfully conducted matches the associated pair of information stored in the data storage location table 500. If the result of step S1016 is YES, the information processing apparatus A (100A) terminates the processing without updating the data storage location table 500. In this case, the authentication information is not updated.

If it is found in step S1014 that the specified data storage location has been registered in the data storage location table 500, and if it is found in step S1016 that a pair of the specified data storage location and the authentication information for which authentication has been successfully conducted does not match the associated pair of information stored in the data storage location table 500 (that is, if authentication information has been updated), the process proceeds to step S1017. In step S1017, the information processing apparatus A (100A) updates the authentication information associated with the data storage location in the data storage location table 500 to the authentication information for which authentication has been successfully conducted.

Figure 12:
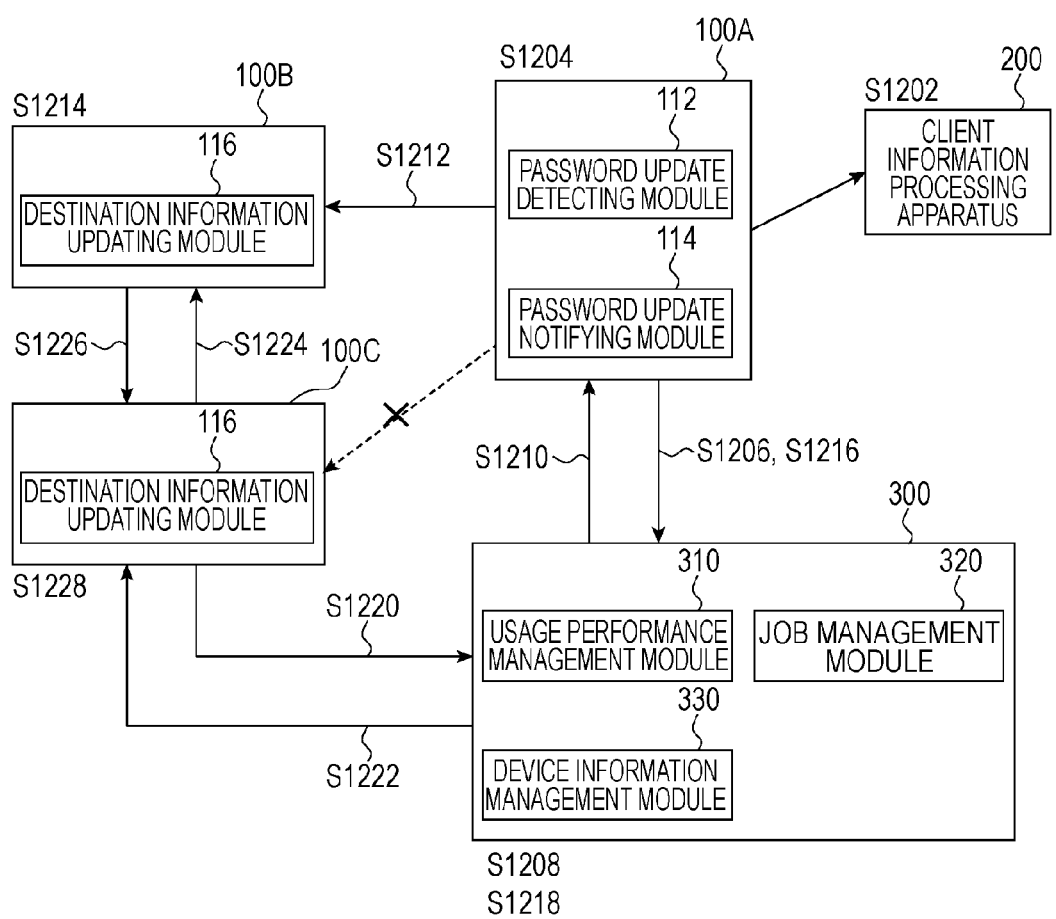
FIG. 12 is a flowchart illustrating an example of processing according to a first exemplary embodiment.

FIG. 12 is a flowchart of an example of processing according to the first exemplary embodiment. In this processing, there is an information processing apparatus 100 (for example, the information processing apparatus C (100C)) with which the information processing apparatus A (100A) is unable to communicate. In this case, the information processing apparatus A (100A) does not notify the management apparatus 300 of a password, which is authentication information. It is assumed that the management apparatus 300 has obtained job logs from information processing apparatuses 100 and manages user IDs, device IDs, and data storage locations associated with processing operations which have been successfully performed by the information processing apparatuses 100. That is, the management apparatus 300 has already generated the management device table 800.

In step S1202, the password update module 210 updates a password.

In step S1204, the password update detecting module 112 detects that the password of a destination of a processing result has been updated and checks the validity of the updated password. Steps S1202 and S1204 correspond to part of the processing shown in FIGS. 10 and 11.

In step S1206, the password update notifying module 114 notifies the management apparatus 300 of a user ID and a storage location associated with the updated password. However, the updated password itself is not sent to the management apparatus 300. It is sufficient that the password update notifying module 114 notifies the management apparatus 300 of at least the storage location associated with the updated password.

In step S1208, the usage performance management module 310 refers to the management device history table 900 and extracts information processing apparatuses (in this case, the information processing apparatus B (100B) and the information processing apparatus C (100C)) that the user identified by the user ID received in step S1206 has requested to perform processing.

In step S1210, the usage performance management module 310 returns a list of the association between the information processing apparatuses (information processing apparatus B (100B) and information processing apparatus C (100C)) extracted in step S1208 and the regular polling times to the information processing apparatus A (100A).

In step S1212, the processing module 110A notifies the information processing apparatuses (information processing apparatus B (100B) and information processing apparatus C (100C)) described in the above-described list of the data storage location and the password.

It is assumed that, in step S1212, the information processing apparatus A (100A) has attempted to communicate with the information processing apparatus B (100B) and the information processing apparatus C (100C) but has failed to communicate with the information processing apparatus C (100C) because, for example, the information processing apparatus C (100C) has been powered OFF. Accordingly, as far as the information processing apparatus C (100C) is concerned, step S1212 has failed, and the information processing apparatus C (100C) has not received the data storage location and the password. If step S1212 has failed, it may be executed repeatedly. In this case, however, step S1212 may be executed until a predetermined time before a regular polling time in the information processing apparatus for which step S1212 (for example, until X minutes before the regular polling time) has failed.

In step S1214, if the same data storage location as that received in step S1212 is recorded in the data storage location table 500 within the information processing apparatus B (100B), the destination information updating module 116 of the information processing apparatus B (100B) changes the password in the authentication information field 520 of the data storage location table 500 to the password received from the information processing apparatus A (100A).

In step S1216, the password update notifying module 114 notifies the management apparatus 300 of the device ID of the information processing apparatus for which step S1212 has failed (in this case, the information processing apparatus C (100C)) and the device ID of the information processing apparatus for which step S1212 has succeeded (in this case, the information processing apparatus B (100B)) by a predetermined time before the regular polling time of the information processing apparatus C (100C).

In step S1218, the job management module 320 creates an instruction (job) to be executed by the information processing apparatus for which step S1212 has failed (in this case, the information processing apparatus C (100C)) so that the information processing apparatus C (100C) can update the password by performing regular polling. This job includes destination information and information concerning information processing apparatuses (in this case, the information processing apparatus A (100A) and the information processing apparatus B (100B)) to which the information processing apparatus C (100C) may send a query about the password.

In step S1220, the information processing apparatus C (100C) accesses the management apparatus 300 by performing polling communication when the regular polling time of the information processing apparatus C (100C) has arrived.

In step S1222, in response to polling communication, the management apparatus 300 sends the job created in step S1218 to the information processing apparatus C (100C).

In step S1224, the destination information updating module 116 of the information processing apparatus C (100C) sends a query about the password corresponding to the destination information included in the job to the information processing apparatus B (100B).

There are plural information processing apparatuses (in this case, the information processing apparatus A (100A) and the information processing apparatus B (100B)) included in the job to which the information processing apparatus C (100C) may send a query about the password. The destination information updating module 116 of the information processing apparatus C (100C) may send a query to any of the information processing apparatuses. If the destination information updating module 116 has failed communication with these information processing apparatuses, it may send a query to another information processing apparatus.

In step S1226, in response to the query, the destination information updating module 116 of the information processing apparatus B (100B) returns the password corresponding to the destination information to the information processing apparatus C (100C).

In step S1228, if the same data storage location as that received in step S1226 is recorded in the data storage location table 500 within the information processing apparatus C (100C), the destination information updating module 116 of the information processing apparatus C (100C) changes the password in the authentication information field 520 of the data storage location table 500 to the password received in step S1226.

Figure 13:
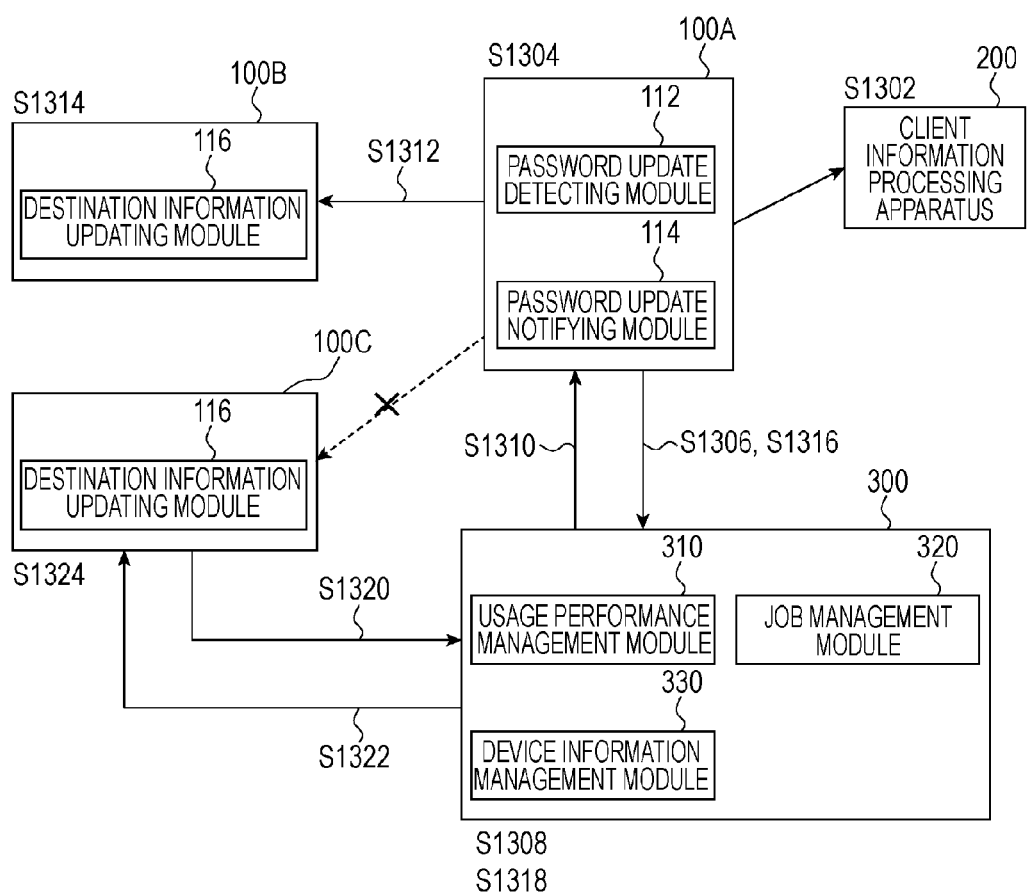
FIG. 13 is a flowchart illustrating an example of processing according to a second exemplary embodiment.

FIG. 13 is a flowchart of an example of processing according to the second exemplary embodiment. In this processing, there is an information processing apparatus 100 (for example, the information processing apparatus C (100C)) with which the information processing apparatus A (100A) is unable to communicate. In this case, the information processing apparatus A (100A) notifies the management apparatus 300 of an encrypted password, which is authentication information. It is assumed that the management apparatus 300 has obtained job logs from information processing apparatuses 100 and manages user IDs, device IDs, and data storage locations associated with processing operations which have been successfully performed by the information processing apparatuses 100. That is, the management apparatus 300 has already generated the management device table 800.

In step S1302, the password update module 210 updates a password.

In step S1304, the password update detecting module 112 detects that the password of a destination of a processing result has been updated and checks the validity of the updated password. Steps S1302 and S1304 correspond to part of the processing shown in FIGS. 10 and 11.

In step S1306, the password update notifying module 114 notifies the management apparatus 300 of a user ID and a storage location associated with the updated password. However, the updated password itself is not sent to the management apparatus 300. It is sufficient that the password update notifying module 114 notifies the management apparatus 300 of at least the storage location associated with the updated password.

In step S1308, the usage performance management module 310 refers to the management device history table 900 and extracts information processing apparatuses (in this case, the information processing apparatus B (100B) and the information processing apparatus C (100C)) that the user identified by the user ID received in step S1306 has requested to perform processing.

In step S1310, the usage performance management module 310 returns a list of the association among the information processing apparatuses (information processing apparatus B (100B) and information processing apparatus C (100C)) extracted in step S1308, the regular polling times, and the public key to the information processing apparatus A (100A).

In step S1312, the processing module 110A notifies the information processing apparatuses (information processing apparatus B (100B) and information processing apparatus C (100C)) described in the above-described list of the data storage location and the password.

It is assumed that, in step S1312, the information processing apparatus A (100A) has attempted to communicate with the information processing apparatus B (100B) and the information processing apparatus C (100C) but has failed to communicate with the information processing apparatus C (100C) because, for example, the information processing apparatus C (100C) has been powered OFF. Accordingly, as far as the information processing apparatus C (100C) is concerned, step S1312 has failed, and the information processing apparatus C (100C) has not received the data storage location and the password. If step S1312 has failed, it may be executed repeatedly. In this case, however, step S1312 may be executed until a predetermined time before a regular polling time (for example, until X minutes before the regular polling time) in the information processing apparatus for which step S1312 has failed.

In step S1314, if the same data storage location as that received in step S1312 is recorded in the data storage location table 500 within the information processing apparatus B (100B), the destination information updating module 116 of the information processing apparatus B (100B) changes the password in the authentication information field 520 of the data storage location table 500 to the updated password received from the information processing apparatus A (100A).

In step S1316, by a predetermined time before the regular polling time of the information processing apparatus for which step S1312 has failed (in this case, the information processing apparatus C (100C)), the password update notifying module 114 notifies the management apparatus 300 of the device ID of the information processing apparatus C (100C) and the password which has not been sent. This password is a password encrypted with the public key of the information processing apparatus C (100C). The password update notifying module 114 may also notify the management apparatus 300 of the device ID of the information processing apparatus for which step S1312 has succeeded (in this case, the information processing apparatus B (100B) to which the data storage location and the password have been successfully sent). This is necessary for the management apparatus 300 to distinguish information processing apparatuses which have identified that the password has been updated from those which have not identified that the password has been updated.

In step S1318, the job management module 320 creates an instruction (job) to be executed by the information processing apparatus for which step S1312 has failed (in this case, the information processing apparatus C (100C)) so that the information processing apparatus C (100C) can update the password by performing regular polling. This job includes destination information and the password encrypted with the public key.

In step S1320, the information processing apparatus C (100C) accesses the management apparatus 300 by performing polling communication when the regular polling time of the information processing apparatus C (100C) has arrived.

In step S1322, in response to polling communication, the management apparatus 300 sends the job created in step S1318 to the information processing apparatus C (100C).

In step S1324, if the same data storage location as that sent in step S1322 is recorded in the data storage location table 500 within the information processing apparatus C (100C), the destination information updating module 116 of the information processing apparatus C (100C) decrypts the password received in step S1322 by using the private key of the information processing apparatus C (100C) and changes the password in the authentication information field 520 of the data storage location table 500 to the decrypted password.

Figure 14:
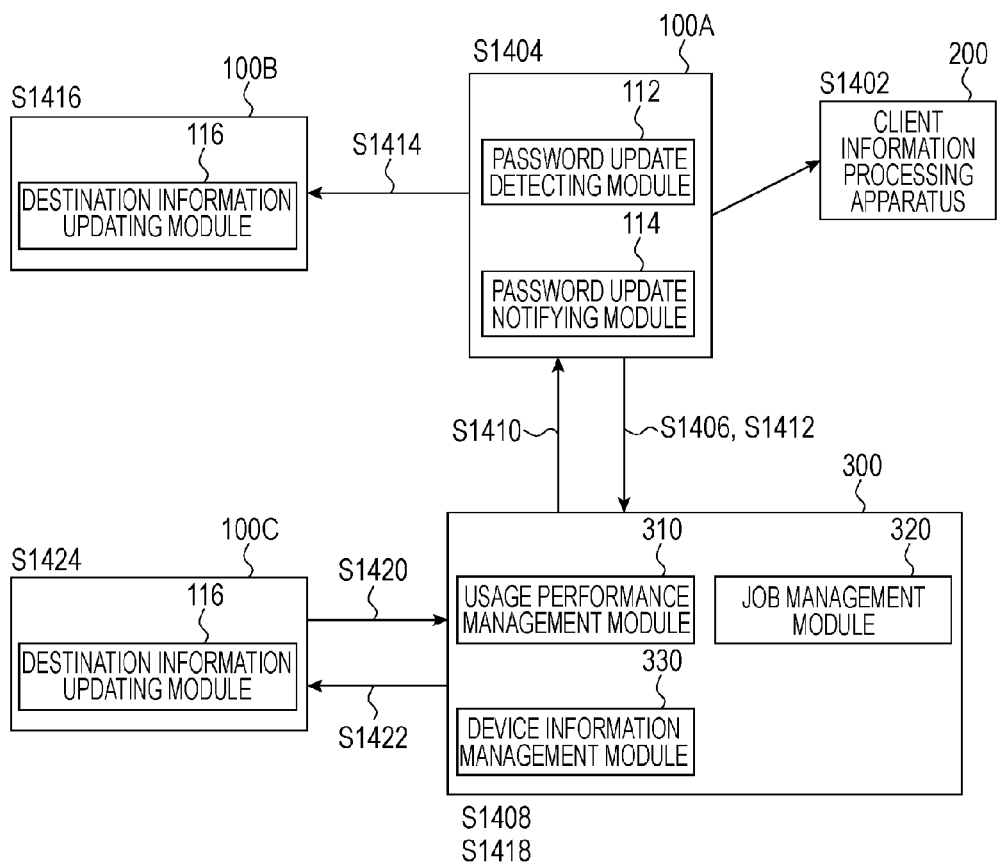
FIG. 14 is a flowchart illustrating an example of processing according to a third exemplary embodiment.

FIG. 14 is a flowchart of an example of processing according to the third exemplary embodiment. In this processing, there is an information processing apparatus in which a regular polling time will arrive within a predetermined time. It is assumed that the management apparatus 300 has obtained job logs from information processing apparatuses 100 and manages user IDs, device IDs, and data storage locations associated with processing operations which have been successfully performed by the information processing apparatuses 100. That is, the management apparatus 300 has already generated the management device table 800.

In step S1402, the password update module 210 updates a password.

In step S1404, the password update detecting module 112 detects that the password of a destination of a processing result has been updated and checks the validity of the updated password. Steps S1402 and S1404 correspond to part of the processing shown in FIGS. 10 and 11.

In step S1406, the password update notifying module 114 notifies the management apparatus 300 of a user ID and a storage location associated with the updated password. However, the updated password itself is not sent to the management apparatus 300. It is sufficient that the password update notifying module 114 notifies the management apparatus 300 of at least the storage location associated with the updated password.

In step S1408, the usage performance management module 310 refers to the management device history table 900 and extracts information processing apparatuses (in this case, the information processing apparatus B (100B) and the information processing apparatus C (100C)) that the user identified by the user ID received in step S1406 has requested to perform processing.

However, if there is an information processing apparatus in which a regular polling time will arrive within a predetermined time, and if this information processing apparatus possesses a public key (in this case, the information processing apparatus C (100C)), such an information processing apparatus is not included in a list to be sent in step S1410. The reason for this is that if there is an information processing apparatus in which a regular polling time will arrive very soon, the management apparatus 300 directly sends an updated password (password encrypted with the public key) to this information processing apparatus.

In step S1410, the usage performance management module 310 returns a list of the information processing apparatus (information processing apparatus B (100B) without including the information processing apparatus C (100C)) extracted in step S1408 to the information processing apparatus A (100A).

Then, the usage performance management module 310 also returns the device ID of the information processing apparatus C (100C) and the public key of this information processing apparatus C (100C) to the information processing apparatus A (100A). In this case, notification excluding information (notification excluding flag) indicating that this information processing apparatus is not included in the list is added to this information processing apparatus (more accurately, apparatus identifying information concerning this information processing apparatus). This notification excluding information is not added to apparatus identifying information concerning the information processing apparatus included in the list. The information processing apparatus to which the notification excluding information is added is an information processing apparatus that the information processing apparatus A (100A) does not have to notify of an updated password. However, the information processing apparatus A (100A) sends an updated password encrypted with the received public key to the management apparatus 300. The information processing apparatus to which the notification excluding information is not added is an information processing apparatus that the information processing apparatus A (100A) is supposed to notify of the updated password.

In step S1412, the password update notifying module 114 encrypts the data storage location associated with the updated password and this updated password with the public key received in step S1410, and notifies the management apparatus 300 of the encrypted data storage location and updated password.

In step S1414, the processing module 110A sends the data storage location and the password to the information processing apparatus B (100B) included in the list.

In step S1416, if the same data storage location as that received in step S1414 is recorded in the data storage location table 500 within the information processing apparatus B (100B), the destination information updating module 116 of the information processing apparatus B (100B) changes the password in the authentication information field 520 of the data storage location table 500 to the password received from the information processing apparatus A (100A).

In step S1418, the job management module 320 creates an instruction (job) to be executed by the information processing apparatus (in this case, the information processing apparatus C (100C)) which is not included in the list in step S1408 so that the information processing apparatus C (100C) can update the password by performing regular polling. This job includes the encrypted data storage location associated with the updated password and the encrypted updated password received in step S1412.

In step S1420, the information processing apparatus C (100C) accesses the management apparatus 300 by performing polling communication when the regular polling time of the information processing apparatus C (100C) has arrived.

In step S1422, in response to polling communication, the management apparatus 300 sends the job created in step S1418 to the information processing apparatus C (100C).

In step S1424, the destination information updating module 116 of the information processing apparatus C (100C) decrypts the encrypted data storage location and updated password included in the job received in step S1422 by using the private key of the information processing apparatus C (100C). If the same data storage location as that associated with the updated password is recorded in the data storage location table 500 within the information processing apparatus C (100C), the destination information updating module 116 of the information processing apparatus C (100C) changes the password in the authentication information field 520 of the data storage location table 500 to the decrypted updated password.

In this processing, both of the data storage location associated with the updated password and the updated password are encrypted. However, it is sufficient that at least the updated password is encrypted.

Figure 15:
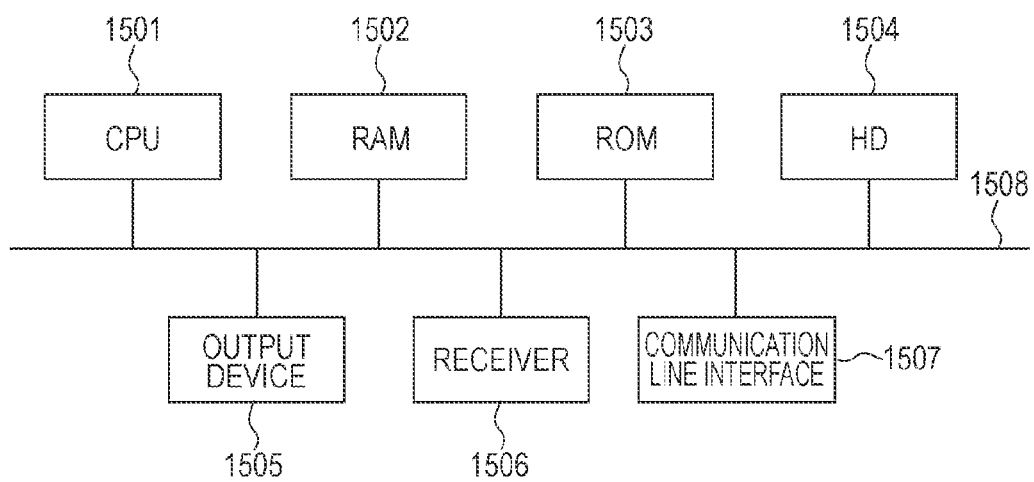
FIG. 15 is a block diagram illustrating an example of the hardware configuration of a computer which implements an exemplary embodiment (a client information processing apparatus and a management apparatus)

The hardware configuration of a computer that executes programs which serve as this exemplary embodiment (the client information processing apparatus 200 and the management apparatus 300) is shown in FIG. 15. This computer is a general computer, and more specifically, a computer which serves as a PC or a server. The computer shown in FIG. 15 includes a CPU 1501, which serves as a processor (arithmetic unit), a RAM 1502, a read only memory (ROM) 1503, and an HD 1504, which serve as storage devices, an output device 1505, a receiver 1506, a communication line interface 1507, and a bus 1508. The CPU 1501 executes programs, such as the password update module 210, the password management module 220, the usage performance management module 310, the job management module 320, and the device information management module 330. The RAM 1502 stores therein these programs and data. The ROM 1503 stores therein a program for starting this computer. The HD 1504, which is, for example, a hard disk, serves as an auxiliary storage device which stores therein tables, such as the authentication table 700, the management device table 800, and the management device history table 900. The receiver 1506 receives data on the basis of an operation performed by a user on a keyboard, a mouse, or a touch panel. The output device 1505 is, for example, a cathode ray tube (CRT) or a liquid crystal display. The communication line interface 1507 is, for example, a network interface card, and is used for connecting the computer to a communication network. The above-described elements are connected to each other via the bus 1508 and send and receive data to and from one another. The above-described computer may be connected to another computer configured similarly to this computer via a network.

Figure 16:
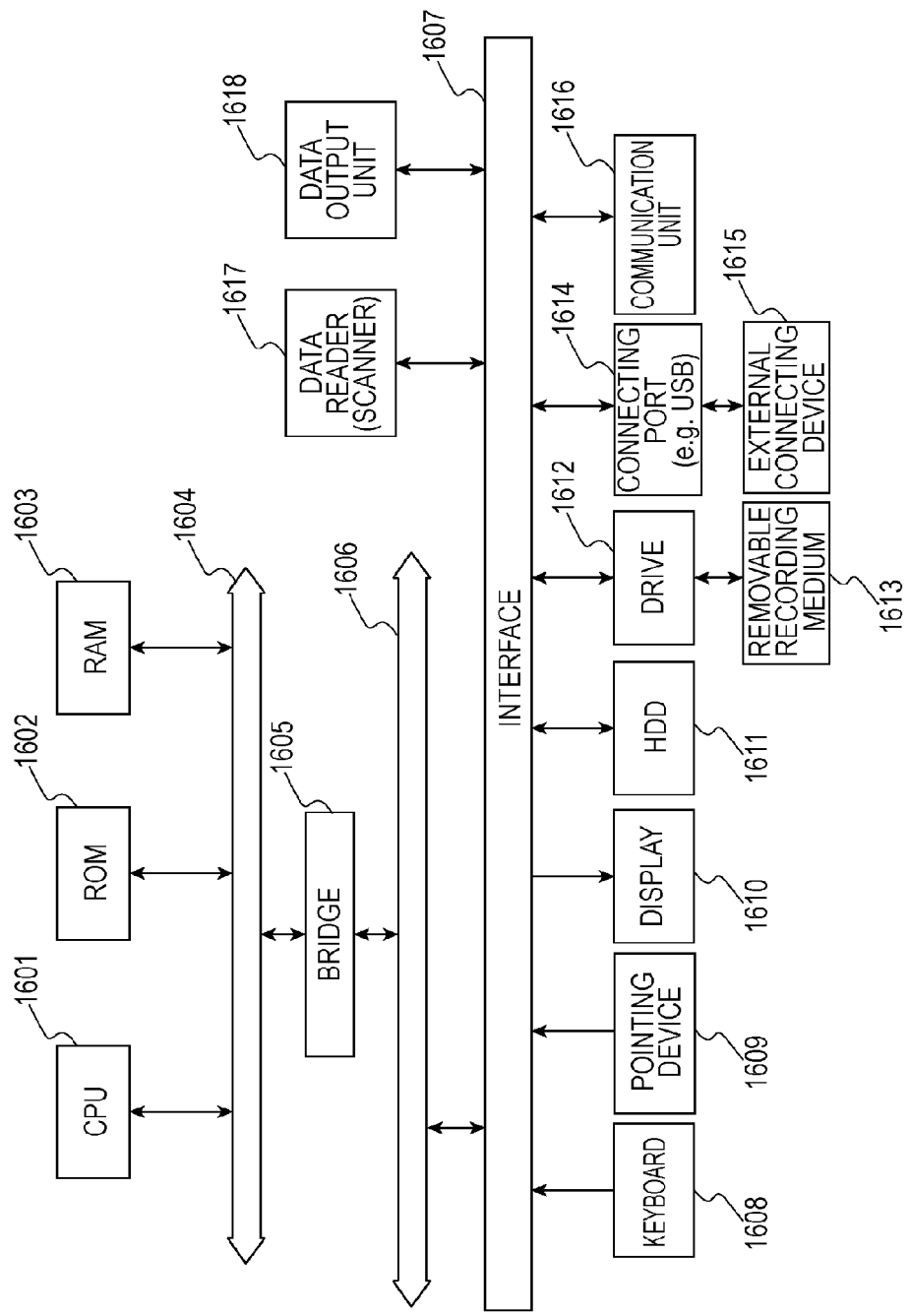
FIG. 16 is a block diagram illustrating an example of the hardware configuration of a computer which implements an exemplary embodiment (an information processing apparatus).

An example of the hardware configuration of the above-described exemplary embodiments (information processing apparatus 100) will be discussed below with reference to FIG. 16. The configuration shown in FIG. 16 is an example of the hardware configuration of, for example, a PC, which includes a data reader 1617, such as a scanner, and a data output unit 1618, such as a printer.

A CPU 1601 is a controller which executes processing in accordance with a computer program which describes an execution sequence of various modules discussed in the above-described exemplary embodiments, such as the processing module 110, the password update detecting module 112, the password update notifying module 114, and the destination information updating module 116.

A ROM 1602 stores therein programs and operation parameters used by the CPU 1601. A RAM 1603 stores therein programs used during the execution of the CPU 1601 and parameters which change appropriately during the execution of the programs. The CPU 1601, the ROM 1602, and the RAM 1603 are connected to one another via a host bus 1604 which is constituted by, for example, a CPU bus.

The host bus 1604 is connected to an external bus 1606, such as a peripheral component interconnect/interface (PCI) bus, via a bridge 1605.

A keyboard 1608 and a pointing device 1609, such as a mouse, are input devices operated by an operator. A display 1610 is, for example, a liquid crystal display or a CRT, and displays various items of information as text or image information.

A hard disk drive (HDD) 1611 has a built-in hard disk and drives the hard disk so as to record or play back information or programs executed by the CPU 1601. In the hard disk, tables, such as the data storage location table 500 and the processing history table 600, are stored. Various other computer programs, such as various data processing programs, are also stored in the hard disk.

A drive 1612 reads data or a program recorded in a removable recording medium 1613, such as a magnetic disk, an optical disc, a magneto-optical disk, or a semiconductor memory, and supplies the read data or program to the RAM 1603 via an interface 1607, the external bus 1606, the bridge 1605, and the host bus 1604. The removable recording medium 1603 is also usable as a data recording region, which is similar to a hard disk.

A connecting port 1614 is a port for connecting the PC to an external connecting device 1615, and has a connecting portion, such as a universal serial bus (USB) port or an IEEE1394 port. The connecting port 1614 is connected to, for example, the CPU 1601, via the interface 1607, the external bus 1606, the bridge 1605, and the host bus 1604. A communication unit 1616 is connected to a connection line and executes data communication processing with an external source. The data reader 1617 is, for example, a scanner, and executes processing for reading documents. The data output unit 1618 is, for example, a printer, and executes processing for outputting document data.

In the above-described exemplary embodiments, concerning an element implemented by a computer program, a computer program, which is software, is read into a system having the system configuration shown in FIG. 15 or 16, and the above-described exemplary embodiments are implemented in a cooperation of software and hardware resources.

The hardware configurations shown in FIGS. 15 and 16 are only examples, and the exemplary embodiments may be configured in any manner as long as the modules described in the exemplary embodiments are executable. For example, some modules may be configured as dedicated hardware (for example, an application specific integrated circuit (ASIC)), or some modules may be installed in an external system and be connected to the PC via a communication line. Alternatively, a system, such as that shown in FIG. 15 or 16, may be connected to a system, such as that shown in FIG. 15 or 16, via a communication line, and may be operated in cooperation with each other. Additionally, instead of a PC, the modules may be integrated into a home information appliance, a copying machine, a fax machine, a scanner, a printer, or a multifunction device.

The above-described program may be stored in a recording medium and be provided. The program recorded on a recording medium may be provided via a communication medium. In this case, the above-described program may be implemented as a "non-transitory computer readable medium storing the program therein" in an exemplary embodiment of the invention.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered), a magneto-optical disk (MO), a flexible disk (FD), magnetic tape, a hard disk, a ROM, an electrically erasable programmable read only memory (EEPROM) (registered), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be part of another program, or may be recorded, together with another program, on a recording medium. The program may be divided and recorded on plural recording media. Further, the program may be recorded in any form, for example, it may be compressed or encrypted, as long as it can be reconstructed.

The above-described exemplary embodiments may be implemented as follows. The following configurations particularly disclose processing of a processor when step S1212 has succeeded.

[A] An information processing system comprising:
a plurality of information processing apparatuses; and
a management apparatus,
each of the plurality of information processing apparatuses including
a memory that stores therein, in association with each storage location in which information is stored, authentication information to be used when storing processed information in a storage location, and
a first notifying unit that notifies, when authentication information associated with a storage location is updated and if the storage location associated with the updated authentication information and the updated authentication information are authenticated, the management apparatus of the storage location associated with the updated authentication information and user identifying information for identifying a user,
the management apparatus including
a recording unit that obtains, from each of the plurality of information processing apparatuses, apparatus identifying information for identifying an information processing apparatus and user identifying information for identifying a user who has requested the information processing apparatus to perform processing and that records the obtained apparatus identifying information and the obtained user identifying information in association with each other,
an extracting unit that extracts apparatus identifying information which is recorded by the recording unit in association with the user identifying information supplied from the first notifying unit, and
an apparatus information notifying unit that notifies the information processing apparatus which has sent information concerning the storage location and the user identifying information by using the first notifying unit of the apparatus identifying information extracted by the extracting unit,
each of the plurality of information processing apparatuses further including
a second notifying unit that notifies, upon receiving the apparatus identifying information from the apparatus information notifying unit, an information processing apparatus identified by the apparatus identifying information received from the apparatus information notifying unit of the storage location associated with the updated authentication information and the updated authentication information, and
an updating unit that updates, upon receiving information concerning a storage location associated with updated authentication information and the updated authentication information from the second notifying unit of another information processing apparatus, authentication information associated with the storage location stored in the memory to the received updated authentication information.

[B] An information processing system comprising:
a plurality of information processing apparatuses; and
a management apparatus,
each of the plurality of information processing apparatuses including
a memory that stores therein, in association with each storage location in which information is stored, authentication information to be used when storing processed information in a storage location, and
a first notifying unit that notifies, when authentication information associated with a storage location is updated and if the storage location associated with the updated authentication information and the updated authentication information are authenticated, the management apparatus of the storage location associated with the updated authentication information,
the management apparatus including
a recording unit that obtains, from each of the plurality of information processing apparatuses, apparatus identifying information for identifying an information processing apparatus and information concerning a storage location in which information processed by the information processing apparatus is stored and that records the obtained apparatus identifying information and the obtained information concerning a storage location in association with each other,
an extracting unit that extracts apparatus identifying information which is recorded by the recording unit in association with the storage location supplied from the first notifying unit, and
an apparatus information notifying unit that notifies the information processing apparatus which has sent information concerning the storage location by using the first notifying unit of the apparatus identifying information extracted by the extracting unit,
each of the plurality of information processing apparatuses further including
a second notifying unit that notifies, upon receiving the apparatus identifying information from the apparatus information notifying unit, an information processing apparatus identified by the apparatus identifying information received from the apparatus information notifying unit of the storage location associated with the updated authentication information and the updated authentication information, and
an updating unit that updates, upon receiving information concerning a storage location associated with updated authentication information and the updated authentication information from the second notifying unit of another information processing apparatus, authentication information associated with the storage location stored in the memory to the received updated authentication information.

[C] An information processing system comprising:
a plurality of information processing apparatuses; and
a management apparatus,
each of the plurality of information processing apparatuses including
a memory that stores therein, in association with each storage location in which information is stored, authentication information to be used when storing processed information in a storage location, and
a first notifying unit that notifies, when authentication information associated with a storage location is updated and if the storage location associated with the updated authentication information and the updated authentication information are authenticated, the management apparatus of the storage location associated with the updated authentication information, the updated authentication information, and user identifying information for identifying a user,
the management apparatus including
a recording unit that obtains, from each of the plurality of information processing apparatuses, apparatus identifying information for identifying an information processing apparatus and user identifying information for identifying a user who has requested the information processing apparatus to perform processing and that records the obtained apparatus identifying information and the obtained user identifying information in association with each other,
an extracting unit that extracts apparatus identifying information which is recorded by the recording unit in association with the user identifying information supplied from the first notifying unit, and
a second notifying unit that notifies an information processing apparatus identified by the apparatus identifying information extracted by the extracting unit of the storage location associated with the updated authentication information and the updated authentication information supplied from the first notifying unit,
each of the plurality of information processing apparatuses further including
an updating unit that updates authentication information associated with the storage location stored in the memory to the updated authentication information received from the second notifying unit.

[D] An information processing system comprising:
a plurality of information processing apparatuses; and
a management apparatus,
each of the plurality of information processing apparatuses including
a memory that stores therein, in association with each storage location in which information is stored, authentication information to be used when storing processed information in a storage location, and
a first notifying unit that notifies, when authentication information associated with a storage location is updated and if the storage location associated with the updated authentication information and the updated authentication information are authenticated, the management apparatus of the storage location associated with the updated authentication information and the updated authentication information,
the management apparatus including
a recording unit that obtains, from each of the plurality of information processing apparatuses, apparatus identifying information for identifying an information processing apparatus and information concerning a storage location in which information processed by the information processing apparatus is stored and that records the obtained apparatus identifying information and the obtained information concerning a storage location in association with each other,
an extracting unit that extracts apparatus identifying information which is recorded by the recording unit in association with the information concerning the storage location supplied from the first notifying unit, and
a second notifying unit that notifies an information processing apparatus identified by the apparatus identifying information extracted by the extracting unit of the storage location associated with the updated authentication information and the updated authentication information supplied from the first notifying unit,
each of the plurality of information processing apparatuses further including
an updating unit that updates authentication information associated with the storage location stored in the memory to the updated authentication information received from the second notifying unit.

[E] An information processing system comprising:
a plurality of information processing apparatuses,
each of the plurality of information processing apparatuses including
a memory that stores therein, in association with each storage location in which information is stored, authentication information to be used when storing processed information in a storage location,
an obtaining unit that obtains, in association with apparatus identifying information for identifying each of the plurality of information processing apparatuses, information concerning a storage location in which information processed by an information processing apparatus is stored,
an extracting unit that extracts, when authentication information associated with a storage location is updated and if the storage location associated with the updated authentication information and the updated authentication information are authenticated, apparatus identifying information concerning an information processing apparatus which has processed information stored in the storage location associated with the updated authentication information, a notifying unit that notifies an information processing apparatus identified by the apparatus identifying information extracted by the extracting unit of the storage location associated with the updated authentication information and the updated authentication information, and an updating unit that updates, upon receiving information concerning a storage location associated with updated authentication information and the updated authentication information from the notifying unit of another information processing apparatus, authentication information associated with the storage location stored in the memory to the updated authentication information received from the notifying unit.

[F] An information processing apparatus comprising:
a memory that stores therein, in association with each storage location in which information is stored, authentication information to be used when storing processed information in a storage location; and
a first notifying unit that notifies, when authentication information associated with a storage location is updated and if the storage location associated with the updated authentication information and the updated authentication information are authenticated, a management apparatus of the storage location associated with the updated authentication information and user identifying information for identifying a user, wherein
the management apparatus obtains, from each of the plurality of information processing apparatuses, apparatus identifying information for identifying an information processing apparatus and user identifying information for identifying a user who has requested the information processing apparatus to perform processing, and records the obtained apparatus identifying information and the obtained user identifying information in association with each other,
the management apparatus extracts apparatus identifying information which is recorded in association with the user identifying information supplied from the first notifying unit, and
the management apparatus notifies the information processing apparatus which has sent information concerning the storage location and the user identifying information by using the first notifying unit of the apparatus identifying information extracted by the extracting unit,
the information processing apparatuses further comprising:
a second notifying unit that notifies an information processing apparatus identified by the apparatus identifying information received from the management apparatus of the storage location associated with the updated authentication information and the updated authentication information; and
an updating unit that updates, upon receiving information concerning a storage location associated with updated authentication information and the updated authentication information from the second notifying unit of another information processing apparatus, authentication information associated with the storage location stored in the memory to the updated authentication information received from the notifying unit.

[G] A non-transitory computer readable medium storing a program causing a computer to execute a process, the process comprising:
notifying, by an information processing apparatus, when authentication information associated with a storage location is updated and if the storage location associated with the updated authentication information and the updated authentication information are authenticated, a management apparatus of the storage location associated with the updated authentication information and user identifying information for identifying a user;

obtaining, by the management apparatus, from each of a plurality of information processing apparatuses, apparatus identifying information for identifying an information processing apparatus and user identifying information for identifying a user who has requested the information processing apparatus to perform processing, and recording the obtained apparatus identifying information and the obtained user identifying information in association with each other;

extracting, by the management apparatus, apparatus identifying information which is recorded in association with the user identifying information supplied from the information processing apparatus;

notifying, by the management apparatus, the information processing apparatus which has sent information concerning the storage location and the user identifying information of the extracted apparatus identifying information;

notifying, by the information processing apparatus, an information processing apparatus identified by the apparatus identifying information received from the management apparatus of the storage location associated with the updated authentication information and the updated authentication information; and updating, by the information processing apparatus, upon receiving information concerning a storage location associated with updated authentication information and the updated authentication information from another information processing apparatus, authentication information associated with the storage location to the received updated authentication information.

[H] An information processing apparatus comprising:
a memory that stores therein, in association with each storage location in which information is stored, authentication information to be used when storing processed information in a storage location; and
a first notifying unit that notifies, when authentication information associated with a storage location is updated and if the storage location associated with the updated authentication information and the updated authentication information are authenticated, a management apparatus of the storage location associated with the updated authentication information, wherein
the management apparatus obtains, from each of the plurality of information processing apparatuses, apparatus identifying information for identifying an information processing apparatus and information concerning a storage location in which information processed by the information processing apparatus is stored, and records the obtained apparatus identifying information and the obtained information concerning a storage location in association with each other,
the management apparatus extracts apparatus identifying information which is recorded in association with the storage location supplied from the first notifying unit, and
the management apparatus notifies the information processing apparatus which has sent information concerning the storage location by using the first notifying unit of the extracted apparatus identifying information,
the information processing apparatuses further comprising:

a second notifying unit that notifies an information processing apparatus identified by the apparatus identifying information received from the management apparatus of the storage location associated with the updated authentication information and the updated authentication information; and an updating unit that updates, upon receiving information concerning a storage location associated with updated authentication information and the updated authentication information from the second notifying unit of another information processing apparatus, authentication information associated with the storage location stored in the memory to the updated authentication information received from the second notifying unit.

[I] A non-transitory computer readable medium storing a program causing a computer to execute a process, the process comprising:

notifying, by an information processing apparatus, when authentication information associated with a storage location is updated and if the storage location associated with the updated authentication information and the updated authentication information are authenticated, a management apparatus of the storage location associated with the updated authentication information;

obtaining, by the management apparatus, from each of a plurality of information processing apparatuses, apparatus identifying information for identifying an information processing apparatus and information concerning a storage location in which information processed by the information processing apparatus is stored, and recording the obtained apparatus identifying information and the obtained information concerning a storage location in association with each other;

extracting, by the management apparatus, apparatus identifying information which is recorded in association with the storage location supplied from the information processing apparatus;

notifying, by the management apparatus, the information processing apparatus which has sent information concerning the storage location of the extracted apparatus identifying information;

notifying, by the information processing apparatus, an information processing apparatus identified by the apparatus identifying information received from the management apparatus of the storage location associated with the updated authentication information and the updated authentication information; and updating, by the information processing apparatus, upon receiving information concerning a storage location associated with updated authentication information and the updated authentication information from another information processing apparatus, authentication information associated with the storage location to the received updated authentication information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a plurality of information processing apparatuses; and
a management apparatus,
a first information processing apparatus of the plurality of information processing apparatuses including
a memory that stores therein, in association with each storage location in which information is stored, authentication information to be used when storing processed information in a storage location, and
a first notifying unit that notifies, when authentication information associated with a storage location is updated, the management apparatus of the storage location associated with the updated authentication information,
the management apparatus including
a recording unit that records apparatus identifying information for identifying each of the plurality of information processing apparatuses and information concerning a storage location in which information processed by each of the plurality of information processing apparatuses is stored such that the apparatus identifying information and the information concerning a storage location are associated with each other,
an extracting unit that extracts apparatus identifying information which is recorded by the recording unit in association with information concerning the storage location supplied from the first notifying unit, and
a first apparatus information notifying unit that notifies the first information processing apparatus of the apparatus identifying information extracted by the extracting unit in response to the information concerning the storage location received from the first notifying unit,
the first information processing apparatus further including
a second notifying unit that notifies, upon receiving the apparatus identifying information from the first apparatus information notifying unit, an information processing apparatus identified by the apparatus identifying information received from the first apparatus information notifying unit of the storage location associated with the updated authentication information and the updated authentication information, and
a third notifying unit that notifies, if the second notifying unit has failed to supply the storage location associated with the updated authentication information and the updated authentication information, the management apparatus of apparatus identifying information concerning a second information processing apparatus of the plurality of information processing apparatuses to which the second notifying unit has succeeded in supplying the storage location associated with the updated authentication information and the updated authentication information and apparatus identifying information concerning a third information processing apparatus of the plurality of information processing apparatuses to which the second notifying unit has failed to supply the storage location associated with the updated authentication information and the updated authentication information,
the management apparatus further including
a second apparatus information notifying unit that notifies, upon receiving communication from the third information processing apparatus, the third information processing apparatus of the storage location associated with the updated authentication information and apparatus identifying information concerning an information processing apparatus in which the authentication information is updated, the third information processing apparatus including a second memory that stores therein, in association with each storage location in which information is stored, authentication information to be used when storing processed information in a storage location, a fourth notifying unit that sends, upon receiving the information concerning the storage location and the apparatus identifying information from the second apparatus information notifying unit, a query about updated authentication information associated with the storage location to the information processing apparatus identified by the apparatus identifying information received from the second apparatus information notifying unit, and an updating unit that updates, upon receiving updated authentication information in response to the query, authentication information associated with the storage location stored in the second memory to the received updated authentication information.

2. The information processing system according to claim 1, wherein:

the recording unit of the management apparatus also stores a communication due time at which an information processing apparatus of the plurality of information processing apparatuses will communicate with the management apparatus;

the extracting unit of the management apparatus also extracts the communication due time;

the first apparatus information notifying unit of the management apparatus notifies the first information processing apparatus of the communication due time extracted by the extracting unit in response to the information concerning the storage location received from the first notifying unit; and the third notifying unit of the first information processing apparatus notifies the management apparatus of the apparatus identifying information concerning the second information processing apparatus and the apparatus identifying information concerning the third information processing apparatus by a predetermined time before the communication due time.

3. The information processing system according to claim 1, wherein the plurality of information processing apparatuses are disposed within a firewall, and the management apparatus is disposed outside the firewall.

4. An information processing system comprising:

a plurality of information processing apparatuses; and a management apparatus, a first information processing apparatus of the plurality of information processing apparatuses including a memory that stores therein, in association with each storage location in which information is stored, authentication information to be used when storing processed information in a storage location, and a first notifying unit that notifies, when authentication information associated with a storage location is updated, the management apparatus of the storage location associated with the updated authentication information, the management apparatus including a recording unit that records apparatus identifying information for identifying each of the plurality of information processing apparatuses, information concerning a storage location in which information processed by each of the plurality of information processing apparatuses is stored, and a public key of each of the plurality of information processing apparatuses such that the apparatus identifying information, the information concerning a storage location, and the public key are associated with one another, an extracting unit that extracts apparatus identifying information and a public key associated with the apparatus identifying information which are recorded by the recording unit in association with information concerning the storage location supplied from the first notifying unit, and a first apparatus information notifying unit that notifies the first information processing apparatus of the apparatus identifying information and the public key extracted by the extracting unit in response to the information concerning the storage location received from the first notifying unit, the first information processing apparatus further including a second notifying unit that notifies, upon receiving the apparatus identifying information and the public key from the first apparatus information notifying unit, an information processing apparatus identified by the apparatus identifying information received from the first apparatus information notifying unit of the storage location associated with the updated authentication information and the updated authentication information, and a third notifying unit that notifies, if the second notifying unit has failed to supply the storage location associated with the updated authentication information and the updated authentication information, the management apparatus of apparatus identifying information concerning a second information processing apparatus of the plurality of information processing apparatuses to which the second notifying unit has failed to supply the storage location associated with the updated authentication information and the updated authentication information and that also notifies the management apparatus of the updated authentication information encrypted with the public key of the second information processing apparatus, the management apparatus further including a second apparatus information notifying unit that notifies, upon receiving communication from the second information processing apparatus, the second information processing apparatus of the storage location associated with the updated authentication information and the encrypted updated authentication information, the second information processing apparatus including a second memory that stores therein, in association with each storage location in which information is stored, authentication information to be used when storing processed information in a storage location, and an updating unit that decrypts, upon receiving information concerning the storage location and the encrypted updated authentication information from the second apparatus information notifying unit, the encrypted updated authentication information and updates authentication information associated with the storage location stored in the second memory to the decrypted updated authentication information.

5. The information processing system according to claim 4, wherein:

the recording unit of the management apparatus also stores a communication due time at which an information processing apparatus of the plurality of information processing apparatuses will communicate with the management apparatus;
the extracting unit of the management apparatus also extracts the communication due time;
the first apparatus information notifying unit of the management apparatus notifies the first information processing apparatus of the communication due time extracted by the extracting unit in response to the information concerning the storage location received from the first notifying unit; and
the third notifying unit of the first information processing apparatus notifies the management apparatus of the apparatus identifying information concerning the second information processing apparatus and the updated authentication information encrypted with the public key of the second information processing apparatus by a predetermined time before the communication due time.

6. An information processing system comprising:
a plurality of information processing apparatuses; and
a management apparatus,
a first information processing apparatus of the plurality of information processing apparatuses including
  a memory that stores therein, in association with each storage location in which information is stored, authentication information to be used when storing processed information in a storage location, and
  a first notifying unit that notifies, when authentication information associated with a storage location is updated, the management apparatus of the storage location associated with the updated authentication information,
the management apparatus including
  a recording unit that records apparatus identifying information for identifying each of the plurality of information processing apparatuses, information concerning a storage location in which information processed by each of the plurality of information processing apparatuses is stored, a public key of each of the plurality of information processing apparatuses, and a communication due time at which each of the plurality of information processing apparatuses will communicate with the management apparatus such that the apparatus identifying information, the information concerning a storage location, the public key, and the communication due time are associated with one another,
  an extracting unit that extracts apparatus identifying information and a communication due time corresponding to the apparatus identifying information which are recorded by the recording unit in association with information concerning the storage location supplied from the first notifying unit, and
  a first apparatus information notifying unit that notifies the first information processing apparatus of the apparatus identifying information extracted by the extracting unit and a public key of an information processing apparatus identified by the apparatus identifying information in response to the information concerning the storage location received from the first notifying unit, wherein, if the communication due time extracted by the extracting unit is within a predetermined time and if the information processing apparatus identified by the apparatus identifying information possesses the public key, the first apparatus information notifying unit adds notification excluding information to the apparatus identifying information, the notification excluding information indicating that the first information processing apparatus does not have to notify the information processing apparatus identified by the apparatus identifying information of the updated authentication information, and the first apparatus information notifying unit notifies the first information processing apparatus of the apparatus identifying information and the public key in response to information concerning the storage location received from the first notifying unit,
the first information processing apparatus further including
  a second notifying unit that notifies, if apparatus identifying information and a public key are received from the first apparatus information notifying unit and if the information processing apparatus identified by the apparatus identifying information is a second information processing apparatus of the plurality of information processing apparatuses to which the notification excluding information is not added, the second information processing apparatus of the storage location associated with the updated authentication information and the updated authentication information, and
  a third notifying unit that notifies, if apparatus identifying information and a public key are received from the first apparatus information notifying unit and if the information processing apparatus identified by the apparatus identifying information is a third information processing apparatus of the plurality of information processing apparatuses to which the notification excluding information is added, the management apparatus of the updated authentication information encrypted with the public key of the third information processing apparatus,
the management apparatus further including
  a second apparatus information notifying unit that notifies, upon receiving communication from the third information processing apparatus, the third information processing apparatus of the storage location associated with the updated authentication information and the encrypted updated authentication information,
the third information processing apparatus including
  a second memory that stores therein, in association with each storage location in which information is stored, authentication information to be used when storing processed information in a storage location, and
  an updating unit that decrypts, upon receiving information concerning the storage location and the encrypted updated authentication information from the second apparatus information notifying unit, the encrypted updated authentication information and updates authentication information associated with the storage location stored in the second memory to the decrypted updated authentication information.

7. An information processing apparatus comprising:
a memory that stores therein, in association with each storage location in which information is stored, authentication information to be used when storing processed information in a storage location; and
a first notifying unit that notifies, when authentication information associated with a storage location is updated, a management apparatus of the storage location associated with the updated authentication information, wherein a recording unit of the management apparatus records apparatus identifying information for identifying each of information processing apparatuses, information concerning a storage location in which information processed by each of the plurality of information processing apparatuses is stored, a public key of each of the plurality of information processing apparatuses, and a communication due time at which each of the plurality of information processing apparatuses will communicate with the management apparatus such that the apparatus identifying information, the information concerning a storage location, the public key, and the communication due time are associated with one another, an extracting unit of the management apparatus extracts apparatus identifying information and a communication due time corresponding to the apparatus identifying information which are recorded by the recording unit in association with information concerning the storage location supplied from the first notifying unit, a first apparatus information notifying unit of the management apparatus notifies the information processing apparatus of the apparatus identifying information extracted by the extracting unit and a public key of an information processing apparatus identified by the apparatus identifying information in response to the information concerning the storage location received from the first notifying unit, and if the communication due time extracted by the extracting unit is within a predetermined time and if the information processing apparatus identified by the apparatus identifying information possesses the public key, the first apparatus information notifying unit adds notification excluding information to the apparatus identifying information, the notification excluding information indicating that the information processing apparatus which has sent the information concerning the storage location associated with the updated authentication information does not have to notify the information processing apparatus identified by the apparatus identifying information of the updated authentication information, and the first apparatus information notifying unit notifies the information processing apparatus which has sent the information concerning the storage location associated with the updated authentication information of the apparatus identifying information and the public key in response to information concerning the storage location received from the first notifying unit, the information processing apparatus further comprising:

a second notifying unit that notifies, if the apparatus identifying information and the public key are received from the first apparatus information notifying unit and if the information processing apparatus identified by the apparatus identifying information is a second information processing apparatus to which the notification excluding information is not added, the second information processing apparatus of the storage location associated with the updated authentication information and the updated authentication information; and a third notifying unit that notifies, if the apparatus identifying information and the public key are received from the first apparatus information notifying unit and if the information processing apparatus identified by the apparatus identifying information is a third information processing apparatus to which the notification excluding information is added, the management apparatus of the updated authentication information encrypted with the public key of the third information processing apparatus, wherein a second apparatus information notifying unit of the management apparatus notifies, upon receiving communication from the third information processing apparatus, the third information processing apparatus of the storage location associated with the updated authentication information and the encrypted updated authentication information.

8. A non-transitory computer readable medium storing a program causing a computer to execute a process, the process comprising:

notifying, by an information processing apparatus, when authentication information associated with a storage location is updated, a management apparatus of the storage location associated with the updated authentication information;

extracting, by the management apparatus, from among items of apparatus identifying information recorded in association with storage locations, apparatus identifying information and a communication due time corresponding to the apparatus identifying information which are recorded in association with information concerning the storage location received from the information processing apparatus;

notifying, by the management apparatus, in response to the information concerning the storage location received from the information processing apparatus, the information processing apparatus of the apparatus identifying information extracted by the extracting unit and a public key of an information processing apparatus identified by the apparatus identifying information;

adding, by the management apparatus, if the communication due time extracted by the extracting unit is within a predetermined time and if the information processing apparatus identified by the apparatus identifying information possesses the public key, notification excluding information to the apparatus identifying information, the notification excluding information indicating that the information processing apparatus which has sent the information concerning the storage location associated with the updated authentication information does not have to notify the information processing apparatus identified by the apparatus identifying information of the updated authentication information, and notifying the information processing apparatus which has sent the information concerning the storage location associated with the updated authentication information of the apparatus identifying information and the public key in response to the information concerning the storage location received from the information processing apparatus;

notifying, by the information processing apparatus, if the apparatus identifying information and the public key are received and if the information processing apparatus identified by the apparatus identifying information is a second information processing apparatus to which the notification excluding information is not added, the second information processing apparatus of the storage location associated with the updated authentication information and the updated authentication information;

notifying, by the information processing apparatus, if the apparatus identifying information and the public key are received and if the information processing apparatus identified by the apparatus identifying information is a third information processing apparatus to which the notification excluding information is added, the management apparatus of the updated authentication information encrypted with the public key of the third information processing apparatus; and notifying, by the management apparatus, upon receiving communication from the third information processing apparatus, the third information processing apparatus of the storage location associated with the updated authentication information and the encrypted updated authentication information.

9. An information processing apparatus comprising:
a memory that stores therein, in association with each storage location in which information is stored, authentication information to be used when storing processed information in a storage location;
a first notifying unit that notifies, when authentication information associated with a storage location is updated, a management apparatus of the storage location associated with the updated authentication information;
a second notifying unit that notifies, upon receiving, from the management apparatus, apparatus identifying information associated with the storage location sent from the first notifying unit, an information processing apparatus identified by the received apparatus identifying information of the storage location associated with the updated authentication information and the updated authentication information; and
a third notifying unit that notifies, if the second notifying unit has failed to supply the storage location associated with the updated authentication information and the updated authentication information, the management apparatus of apparatus identifying information concerning a second information processing apparatus to which the second notifying unit has succeeded in supplying the storage location associated with the updated authentication information and the updated authentication information and apparatus identifying information concerning a third information processing apparatus to which the second notifying unit has failed to supply the storage location associated with the updated authentication information and the updated authentication information.

10. The information processing apparatus according to claim 9, wherein:
upon receiving apparatus identifying information associated with the storage location sent from the first notifying unit and a public key associated with the apparatus identifying information from the management apparatus, the second notifying unit notifies an information processing apparatus identified by the received apparatus identifying information of the storage location associated with the updated authentication information and the updated authentication information; and
if the second notifying unit has failed to supply the storage location associated with the updated authentication information and the updated authentication information, the third notifying unit notifies the management apparatus of the apparatus identifying information concerning the third information processing apparatus and the updated authentication information encrypted with a public key of the third information processing apparatus.

11. An information processing apparatus comprising:
a memory that stores therein, in association with each storage location in which information is stored, authentication information to be used when storing processed information in a storage location;
a first notifying unit that notifies, when authentication information associated with a storage location is updated, a management apparatus of the storage location associated with the updated authentication information; and
a second notifying unit that notifies, upon receiving, from the management apparatus, apparatus identifying information associated with the storage location supplied from the first notifying unit and a public key associated with the apparatus identifying information, if an information processing apparatus identified by the apparatus identifying information is a second information processing apparatus to which information is not added, the second information processing apparatus of the storage location associated with the updated authentication information and the updated authentication information, and if an information processing apparatus identified by the apparatus identifying information is a third information processing apparatus to which information is added, the second notifying unit notifying the management apparatus of the updated authentication information encrypted with a public key of the third information processing apparatus.

* * * * *